(12) United States Patent
Furusato et al.

(10) Patent No.: US 10,615,565 B2
(45) Date of Patent: Apr. 7, 2020

(54) LINE NARROWED LASER APPARATUS

(71) Applicant: Gigaphoton Inc., Tochigi (JP)

(72) Inventors: Hiroshi Furusato, Oyama (JP);
Keisuke Ishida, Oyama (JP); Takeshi Ohta, Oyama (JP); Takahito Kumazaki, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/857,894

(22) Filed: Dec. 29, 2017

(65) Prior Publication Data

US 2018/0123312 A1 May 3, 2018

Related U.S. Application Data

(63) Continuation of application No. PCT/JP2015/072456, filed on Aug. 7, 2015.

(51) Int. Cl.
*H01S 3/11* (2006.01)
*H01S 3/08* (2006.01)
(Continued)

(52) U.S. Cl.
CPC .............. *H01S 3/11* (2013.01); *H01S 3/0078* (2013.01); *H01S 3/08004* (2013.01);
(Continued)

(58) Field of Classification Search
CPC ............ H01S 3/134; H01S 3/22–2258; H01S 3/0078; H01S 3/137; H01S 2301/04
See application file for complete search history.

(56) References Cited

U.S. PATENT DOCUMENTS 5,898,725 A 4/1999 Fomenkov et al.
6,870,865 B2 3/2005 Nagai et al.
(Continued)

FOREIGN PATENT DOCUMENTS

CN 103794982 A 5/2014
DE 101 40 903 A1 5/2002
(Continued)

OTHER PUBLICATIONS

International Search Report issued in PCT/JP2015/072456; dated Oct. 27, 2015.
(Continued)

*Primary Examiner* — Joshua King
(74) *Attorney, Agent, or Firm* — Studebaker & Brackett PC

(57) ABSTRACT

The line narrowed laser apparatus configured to perform a plurality of burst oscillations including a first burst oscillation and a second burst oscillation next to the first burst oscillation to output a pulse laser beam. The line narrowed laser apparatus comprises a laser resonator, a chamber provided in the laser resonator, a pair of electrodes provided in the chamber, an electric power source configured to apply pulsed voltage to the pair of electrodes, a wavelength selecting element provided in the laser resonator, a spectral width varying unit provided in the laser resonator, and a controller. The controller is configured to measure a duty in a predetermined period before starting the second burst oscillation and a length of a suspension period from a time of ending the first burst oscillation to a time of starting the second burst oscillation, and perform a first control of the spectral width varying unit based on the duty and the length of the suspension period.

18 Claims, 23 Drawing Sheets

(51) Int. Cl.
*H01S 3/139* (2006.01)
*H01S 3/134* (2006.01)
*H01S 3/137* (2006.01)
*H01S 3/00* (2006.01)
*H01S 3/225* (2006.01)

(52) U.S. Cl.
CPC .......... *H01S 3/08009* (2013.01); *H01S 3/134* (2013.01); *H01S 3/137* (2013.01); *H01S 3/1398* (2013.01); *H01S 3/225* (2013.01); *H01S 2301/04* (2013.01)

(56) References Cited

U.S. PATENT DOCUMENTS

| | | | |
|---|---|---|---|
| 7,643,522 B2 | 1/2010 | Trintchouk et al. | |
| 8,563,956 B1* | 10/2013 | Melchior | G03F 7/70025 250/365 |
| 2002/0075932 A1* | 6/2002 | Stamm | H01S 3/08004 372/57 |
| 2003/0016708 A1* | 1/2003 | Albrecht | H01S 3/1055 372/25 |
| 2007/0014326 A1* | 1/2007 | Wakabayashi | H01S 3/08009 372/92 |
| 2007/0297467 A1* | 12/2007 | Fomenkov | H01S 3/225 372/25 |
| 2008/0205472 A1* | 8/2008 | Dunstan | G03F 7/70025 372/59 |
| 2008/0232408 A1* | 9/2008 | O'Brien | G03F 7/70575 372/19 |
| 2008/0285602 A1 | 11/2008 | Nagai et al. | |
| 2013/0100980 A1* | 4/2013 | Abe | H01S 3/134 372/57 |
| 2016/0238532 A1* | 8/2016 | Freudiger | G01N 21/6402 |

FOREIGN PATENT DOCUMENTS

| | | |
|---|---|---|
| JP | H10-209548 A | 8/1998 |
| JP | 2003-249435 A | 9/2003 |
| JP | 2006-024855 A | 1/2006 |
| JP | 2008-098282 A | 4/2008 |

OTHER PUBLICATIONS

International Preliminary Report on Patentability and Written Opinion issued in PCT/JP2015/072456; dated Feb. 13, 2018.

An Office Action mailed by the State Intellectual Property Office of the People's Republic of China dated Jul. 17, 2019, which corresponds to Chinese Patent Application No. 201580081429.0 and is related to U.S. Appl. No. 15/857,894.

* cited by examiner

FIG. 11
| LENGTH OF SUSPENSION PERIOD Tr | Tr(1) | Tr(2) | ⋯ | Tr(n) |
|---|---|---|---|---|
| AMOUNT OF CHANGE $\Delta E95s$ IN SPECTRAL WIDTH | $\Delta E95s(1)$ | $\Delta E95s(2)$ | ⋯ | $\Delta E95s(n)$ |
FIG. 12
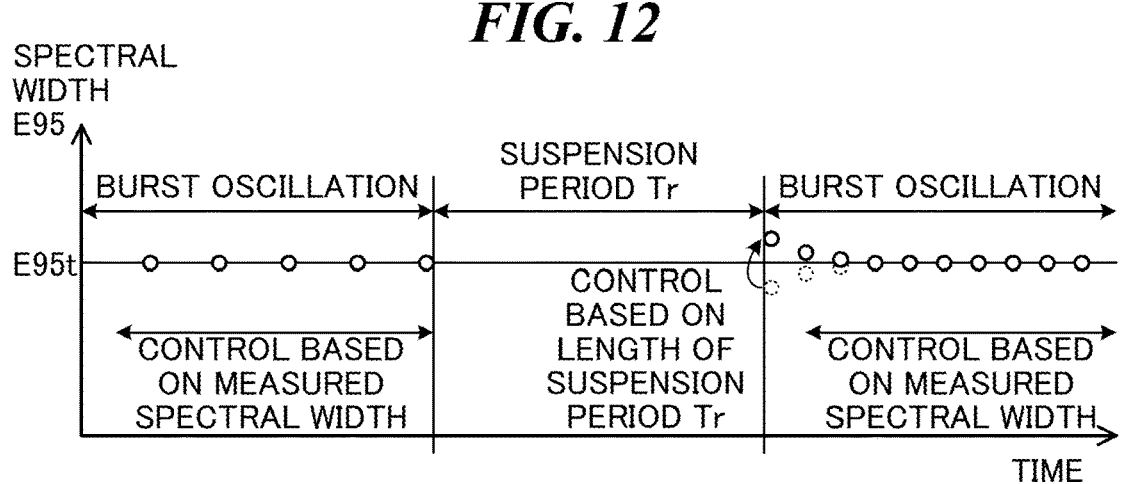
FIG. 13
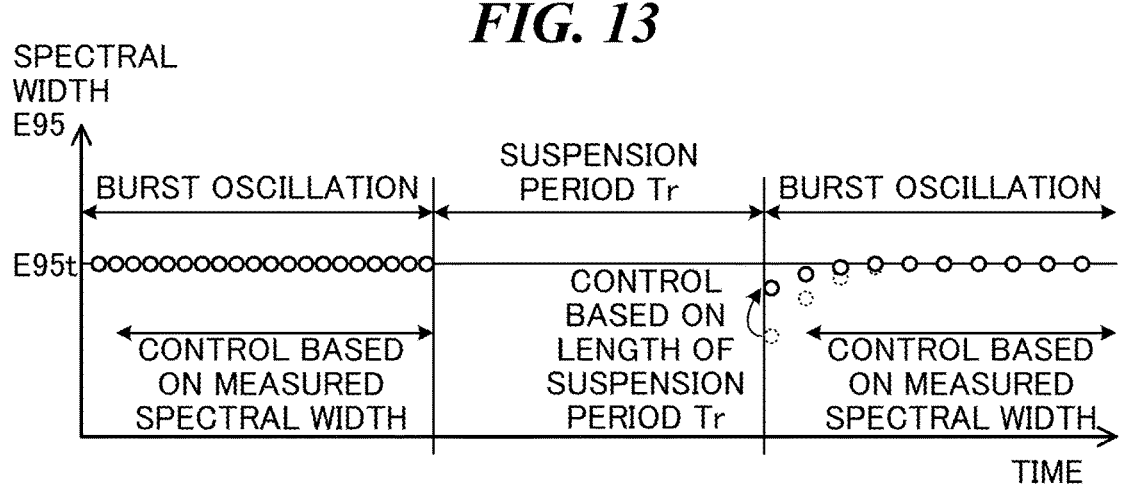

| | | LENGTH OF SUSPENSION PERIOD Tr | | | |
|---|---|---|---|---|---|
| | | Tr(1) | Tr(2) | ... | Tr(n) |
| DUTY D IN THE PREVIOUS BURST OSCILLATION | D(1) | ΔE95s(1,1) | ΔE95s(1,2) | ... | ΔE95s(1,n) |
| | D(2) | ΔE95s(2,1) | ΔE95s(2,2) | ... | ΔE95s(2,n) |
| | D(3) | ΔE95s(3,1) | ΔE95s(3,2) | ... | ΔE95s(3,n) |
| | ... | ... | ... | ... | ... |
| | D(m) | ΔE95s(m,1) | ΔE95s(m,2) | ... | ΔE95s(m,n) |

US 10,615,565 B2

LINE NARROWED LASER APPARATUS

TECHNICAL FIELD

The present disclosure relates to a line narrowed laser apparatus.

BACKGROUND ART

The recent miniaturization and increased levels of integration of semiconductor integrated circuits have led to a demand for increases in the resolutions of semiconductor exposure apparatuses. A semiconductor exposure apparatus is hereinafter referred to simply as "exposure apparatus". Accordingly, exposure light sources to output light at shorter wavelengths have been under development. As the exposure light sources, gas laser apparatuses instead of conventional mercury lamps are typically used. The gas laser apparatuses for exposure include a KrF excimer laser apparatus that outputs an ultraviolet laser beam at a wavelength of 248 nm and an ArF excimer laser apparatus that outputs an ultraviolet laser beam at a wavelength of 193 nm.

As a current exposure technology, immersion exposure has been put into practical use. In the immersion exposure, a gap between an exposure lens and a wafer in an exposure apparatus is filled with fluid such as water to change refractive index in the gap, such that an apparent wavelength of the light from the exposure light source is shortened. In a case where immersion exposure is performed using an ArF excimer laser apparatus as an exposure light source, a wafer is irradiated with ultraviolet light whose wavelength in water is equivalent to 134 nm. This technology is referred to as "ArF immersion exposure". The ArF immersion exposure is also referred to as "ArF immersion lithography".

Spectrum line widths of KrF and ArF excimer laser apparatuses in natural oscillation are as wide as approximately 350 pm to 400 pm. This causes a chromatic aberration of a laser beam (ultraviolet light) that is subjected to reduced projection onto a wafer by a projection lens in an exposure apparatus. The chromatic aberration thus causes reduction in resolving power. Therefore, a spectrum line width of a laser beam that is outputted from a gas laser apparatus needs to be narrowed to such an extent that the chromatic aberration can be ignored. The spectrum line width is also referred to as "spectrum width". To narrow the spectrum width, a laser resonator of a gas laser apparatus is equipped with a line narrow module having a line narrow element. The line narrow element may be an etalon, a grating, or the like. A laser apparatus whose spectrum width is narrowed in this way is referred to as "line narrowed laser apparatus".

Patent Document 1: U.S. Pat. No. 7,643,522 B
Patent Document 2: Japanese Patent Application. Publication. No. 2008-098282 A
Patent Document 3: U.S. Pat. No. 6,870,865 B
Patent Document 4: U.S. Pat. No. 7,903,700 B

SUMMARY

An aspect of the present disclosure may be related to a line narrowed laser apparatus configured to perform a plurality of burst oscillations including a first burst oscillation and a second burst oscillation next to the first burst oscillation to output a pulse laser beam. The line narrowed laser apparatus comprises a laser resonator, a chamber provided in the laser resonator, a pair of electrodes provided in the chamber, an electric power source configured to apply pulsed voltage to the pair of electrodes, a wavelength selecting element provided in the laser resonator, a spectral width varying unit provided in the laser resonator, and a controller. The controller is configured to measure a duty in a predetermined period before starting the second burst oscillation and a length of a suspension period from a time of ending the first burst oscillation to a time of starting the second burst oscillation, and perform a first control of the spectral width varying unit based on the duty and the length of the suspension period.

Another aspect of the present disclosure may also be related to a line narrowed laser apparatus configured to perform a plurality of burst oscillations including a first burst oscillation and a second burst oscillation next to the first burst oscillation to output a pulse laser beam. The line narrowed laser apparatus of this aspect comprises a laser resonator, a first chamber provided in the laser resonator, a first pair of electrodes provided in the first chamber, a first electric power source configured to apply pulsed voltage to the first pair of electrodes, a wavelength selecting element provided in the laser resonator, a second chamber provided in an optical path of the pulse laser beam outputted from the laser resonator, a second pair of electrodes provided in the second chamber, a second electric power source configured to apply pulsed voltage to the second pair of electrodes, and a controller. The controller is configured to measure a duty in a predetermined period before starting the second burst oscillation and a length of a suspension period from a time of ending the first burst oscillation to a time of starting the second burst oscillation, and performs a first control of a difference between a timing of a first electric discharge between the first pair of electrodes and a timing of a second electric discharge between the second pair of electrodes based on the duty and the length of the suspension period.

BRIEF DESCRIPTION OF DRAWINGS

Exemplary embodiments of the present disclosure will be described below as mere examples with reference to the appended drawings.

FIG. 4 explains a basic concept of control of the spectral width performed by a spectral width controller 30a.

FIG. 5 explains the basic concept of control of the spectral width performed by the spectral width controller 30a.

FIG. 11 shows a structure of a data table on the relation of the amount of change ΔE95s in the spectral width to the length of the suspension period Tr.

FIG. 12 explains a problem to be solved by the present disclosure.

FIG. 13 explains the problem to be solved by the present disclosure.

DESCRIPTION OF EMBODIMENTS

Contents
1. Line Narrowed Laser Apparatus According to Comparative Example
   1.1 Laser Chamber
   1.2 Line Narrow Module
   1.3 Spectral Width Varying Unit
   1.4 Energy Sensor
   1.5 Etalon Spectroscope
   1.6 Controller
   1.7 Operation
   1.8 Problem
2. Line Narrowed Laser Apparatus That Controls Spectral Width Based on Duty (First Embodiment)
   2.1 Configuration
   2.2 Operation
   2.3 Details of Spectral Width Varying Unit
3. Line Narrowed Laser Apparatus That Updates Data by Adjusting Oscillation (Second Embodiment)
   3.1 Configuration
   3.2 Operation
   3.2.1 Main Flow
   3.2.2 Details of Adjusting Oscillation
4. Line Narrowed Laser Apparatus That Controls Spectral Width Using Approximate Curve (Third Embodiment)
   4.1 Control of Spectral Width
   4.2 Adjusting Oscillation
5. Modified Examples of Measuring Duty
   5.1 First Modified Example
   5.2 Second Modified Example
6. Line Narrowed Laser Apparatus That Controls Spectral Width by Synchronization of MOPO (Fourth Embodiment)
7. Configuration of Controller Embodiments of the present disclosure will be described in detail below with reference to the drawings. The embodiments described below indicate several examples of the present disclosure, and may not intend to limit the content of the present disclosure. Not all of the configurations and operations described in the embodiments are indispensable in the present disclosure. Identical reference symbols may be assigned to identical constituent elements and redundant descriptions thereof may be omitted.

1. Line Narrowed Laser Apparatus According to Comparative Example

Figure 1:
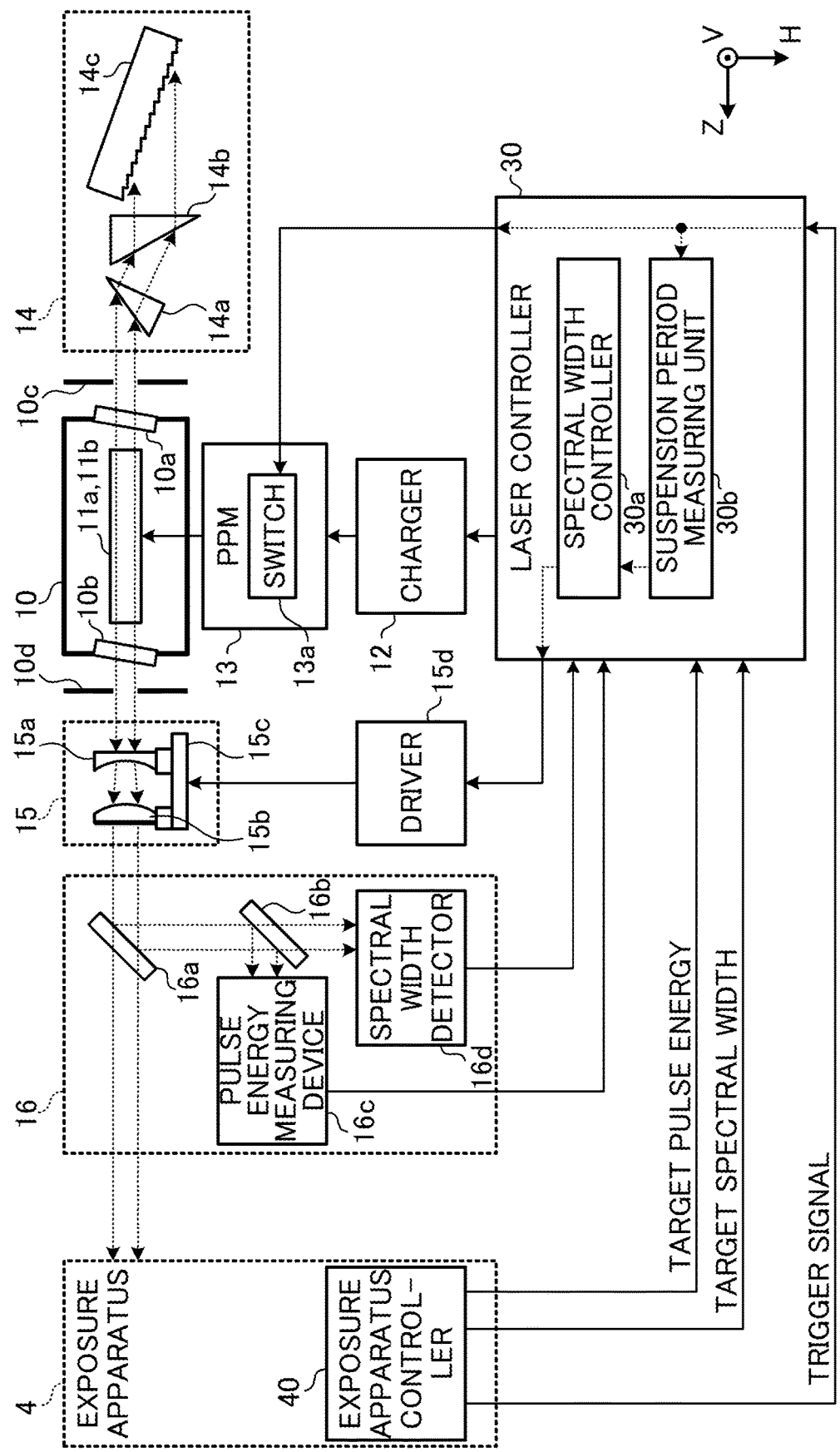
FIG. 1 schematically shows a configuration of a line narrowed laser apparatus according to a comparative example.

FIG. 1 schematically shows a configuration of a line narrowed laser apparatus according to a comparative example. The line narrowed laser apparatus shown in FIG. 1 may include a laser chamber 10, a pair of discharge electrodes 11a and 11b, a charger 12, a pulse power module (PPM) 13, a line narrow module 14, and a spectral width varying unit 15. The line narrowed laser apparatus may further include a sensor unit 16 and a laser controller 30. The line narrowed laser apparatus may be an excimer laser apparatus that outputs a pulse laser beam to enter an exposure apparatus 4.

FIG. 1 shows the line narrowed laser apparatus as viewed in a direction substantially parallel to a direction of electric discharge between the pair of discharge electrodes 11a and 11b. The discharge electrode 11b may be in a position hidden by the discharge electrode 11a in this figure. The travelling direction of the pulse laser beam outputted from the line narrowed laser apparatus may be a Z direction. The direction of electric discharge between the pair of discharge electrodes 11a and 11b may be a V direction or a −V direction. The direction perpendicular to both directions may be an H direction.

1.1 Laser Chamber

The laser chamber 10 may be a chamber that contains laser gas including, for example, rare gas such as argon gas or krypton gas, halogen gas such as fluorine gas or chlorine gas, and buffer gas such as neon gas or helium gas. Respective ends of the laser chamber 10 may be equipped with windows 10a and 10b.

The pair of discharge electrodes 11a and 11b may be provided in the laser chamber 10 to excite the laser medium by electric discharge. The pulse power module 13 may be connected to the charger 12. The pulse power module 13 may include an unillustrated charging capacitor and a switch 13a. An output of the charger 12 may be connected to the charging capacitor. The charging capacitor may hold electric energy for applying high voltage to the pair of discharge electrodes 11a and 11b. The laser controller 30 may input a trigger signal to the switch 13a to turn ON the switch 13a. The pulse power module 13 may then generate pulsed high voltage from the electric energy held by the charger 12. The pulsed high voltage may be applied to the pair of discharge electrodes 11a and 11b.

The high voltage applied to the pair of discharge electrodes 11a and 11b may cause electric discharge to be generated between the pair of discharge electrodes 11a and 11b. Energy of the electric discharge may excite the laser medium in the laser chamber 10 to cause the laser medium to shift to a high energy level. The excited laser medium may then shift back to a low energy level to generate light depending on the difference between the energy levels.

As shown in FIG. 1, the windows 10a and 10b may be provided such that the plane of incidence of the light incident on each window substantially coincides with the HZ plane, and the angle of incidence of the light substantially matches the Brewster's angle. The light generated in the laser chamber 10 may be emitted via the windows 10a and 10b to the exterior of the laser chamber 10.

1.2 Line Narrow Module

The line narrow module 14 may include two prisms 14a and 14b and a grating 14c. The prisms 14a and 14b and the grating 14c may each be held by an unillustrated holder. The line narrow module 14 may constitute a wavelength selecting element of the present disclosure.

The prisms 14a and 14b may expand the beam width in the H direction of the light emitted via the window 10a of the laser chamber 10, to allow the light to be incident on the grating 14c. Also, the prisms 14a and 14b may reduce the beam width in the H direction of reflected light from the grating 14c to allow the light to return to an electric discharge space in the laser chamber 10 via the window 10a.

The grating 14c may have a high reflective material on its surface with multiple grooves at prescribed intervals. Each of the grooves may be, for example, a right triangular groove. The light incident on the grating 14c from the prisms 14a and 14b may be reflected by these grooves while being diffracted to directions according to wavelengths of the light. The grating 14c may be in a Littrow arrangement such that an angle of incidence of the light incident on the grating 14c from the prisms 14a and 14b and an angle of diffraction of the diffracted light having a desired wavelength are substantially equal to each other. The light having a wavelength around the desired wavelength may thus return to the laser chamber 10 via the prisms 14a and 14b.

1.3 Spectral Width Varying Unit

The spectral width varying unit 15 may include a plano-concave cylindrical lens 15a and a plano-convex cylindrical lens 15b. Distance to the laser chamber 10 from the plano-concave cylindrical lens 15a may be less than that from the plano-convex cylindrical lens 15b. These lenses may be arranged such that the concave surface of the plano-concave cylindrical lens 15a and the convex surface of the plano-convex cylindrical lens 15b face each other. The plano-concave cylindrical lens 15a may be movable in the Z direction and the −Z direction with a linear stage 15c. The linear stage 15c may be driven by a driver 15d. The plane surface of the plano-convex cylindrical lens 15b may be coated with a partially reflective film. The spectral width varying unit 15 including the plano-convex cylindrical lens 15b may thus transmit and output a part of the light outputted from the window 10b of the laser chamber 10, and reflect another part to return it to the laser chamber 10.

Moving the plano-concave cylindrical lens 15a in the direction or the −Z direction may allow wavefront of the light incident on the spectral width varying unit 15 from the laser chamber 10 to be adjusted and returned to the laser chamber 10. Adjusting the wavefront may cause spectral width of the light selected by the line narrow module 14 to be changed.

A slit plate 10c to limit the beam width of the light may be provided between the laser chamber 10 and the line narrow module 14. Another slit plate 10d to limit the beam width of the light may be provided between the laser chamber 10 and the spectral width varying unit 15.

The line narrow module 14 and the spectral width varying unit 15 may constitute an optical resonator. The light emitted from the laser chamber 10 may reciprocate between the line narrow module 14 and the spectral width varying unit 15. The light may thus be amplified each time it passes through the electric discharge space between the discharge electrodes 11a and 11b to cause laser oscillation. The spectral width of the laser beam may be narrowed each time the beam is returned by the line narrow module 14. Further, a polarized light component polarized in the H direction may be selected by the arrangement of the windows 10a and 10b described above. The laser beam thus being amplified may be outputted from the spectral width varying unit 15 to the exposure apparatus 4.

1.4 Energy Sensor

The sensor unit 16 may be provided in an optical path of the pulse laser beam between the spectral width varying unit 15 and the exposure apparatus 4. The sensor unit 16 may include beam splitters 16a and 16b, a pulse energy measuring device 16c, and a spectral width detector 16d. The beam splitter 16a may transmit the pulse laser beam outputted from the spectral width varying unit 15 at a high transmittance, and reflect a part of the pulse laser beam outputted from the spectral width varying unit 15. The beam splitter 16b may be provided in an optical path of the pulse laser beam reflected by the beam splitter 16a. The beam splitter 16b may transmit a part of the pulse laser beam reflected by the beam splitter 16a, and reflect another part of the pulse laser beam reflected by the beam splitter 16a.

The pulse energy measuring device 16c may be provided in an optical path of the pulse laser beam reflected by the beam splitter 16b. The pulse energy measuring device 16c may detect pulse energy of the pulse laser beam reflected by the beam splitter 16b. The pulse energy measuring device 16c may output data on the detected pulse energy to the laser controller 30. The pulse energy measuring device 16c may be constituted by a photo-diode, a photoelectric tube, or a pyroelectric element.

The spectral width detector 16d may be provided in an optical path of the pulse laser beam transmitted by the beam splitter 16b. The spectral width detector 16d may detect spectral width of the pulse laser beam transmitted by the beam splitter 16b. The spectral width detector 16d may output data on the detected spectral width to the laser controller 30. The spectral width detector 16d may include an etalon spectroscope. A specific configuration of the etalon spectroscope is described below with reference to FIG. 2.

1.5 Etalon Spectroscope

Figure 2:
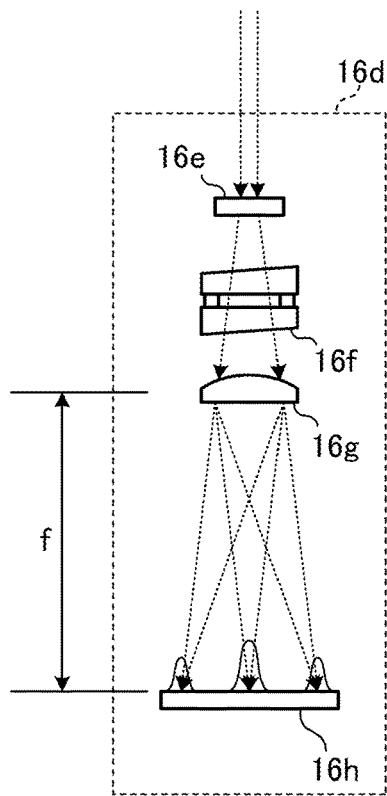
FIG. 2 shows an example of a specific configuration of an etalon spectroscope included in a spectral width detector 16d shown in FIG. 1.

FIG. 2 shows an example of a specific configuration of the etalon spectroscope included in the spectral width detector 16d shown in FIG. 1. The etalon spectroscope may include a diffusing plate 16e, an etalon 16f, a light condensing lens 16g, and a line sensor 16h.

The diffusing plate 16e may be a transmissive optical element with multiple projections and depressions on its surface. The pulse laser beam entered to the diffusing plate 16e may be emitted from the diffusing plate 16e as scattered light. The scattered light emitted from the diffusing plate 16e may be incident on the etalon 16f.

The etalon 16f may be an air gap etalon including two partially reflective mirrors each having a predetermined reflectance R. In the air gap etalon, the two partially reflective mirrors may face each other with an air gap d being a predetermined distance and be fixed to each other with a spacer between them.

A part of the light directly transmitted by the etalon 16f without reciprocating between the two partially reflective mirrors and another part of the light transmitted by the etalon 16f after reciprocating once between the two partially reflective mirrors may be different in optical path length. The difference in the optical path length may be different according to angles of incidence θ of the parts of the light incident on the etalon 16f. If the difference in the optical path length is m times as long as the wavelength λ of the light, where m is an integer, a part of the light directly transmitted by the etalon 16f without reciprocating between the two partially reflective mirrors and multiple parts of the light transmitted by the etalon 16f after reciprocating once, twice, . . . , and k times between the two partially reflective mirrors may interfere with each other. Such interference may allow the light to be transmitted by the etalon 16f at high transmittance.

A basic formula of an etalon is shown below.

$$m\lambda = 2nd\cos\theta \qquad \text{Formula 1}$$

Here, n represents refractive index of the air gap.

The light having the wavelength λ and being incident on the etalon 16f at the angle of incidence θ that satisfies Formula 1 may pass through the etalon 16f at high transmittance.

The angle of incidence θ of light transmitted by the etalon 16f at high transmittance may thus be different according to the wavelength of the light incident on the etalon 16f. The light transmitted by the etalon 16f may enter the light condensing lens 16g.

The light condensing lens 16g may be a condensing optical element. The light transmitted by the light condensing lens 16g may be incident on the line sensor 16h provided at the focal length f of the light condensing lens 16g from the light condensing lens 16g. The light transmitted by the light condensing lens 16g may form interference fringes at the line sensor 15h.

Based on Formula 1 described above, a square of a radius of an interference fringe may be in proportion to a wavelength of the pulse laser beam.

The line sensor 16h may receive the light transmitted by the light condensing lens 16g and detect the interference fringes. The interference fringes may allow an unillustrated arithmetic circuit in the spectral width detector 16d to detect wavelength components in the pulse laser beam and calculate the spectral width. Data on the spectral width may be outputted to the laser controller 30. Alternatively, the laser controller 30 may have some or all of the functions of the arithmetic circuit described above. Further, the line sensor 16h may be substituted by an unillustrated 1-dimensional or 2-dimensional image sensor.

Figure 3:
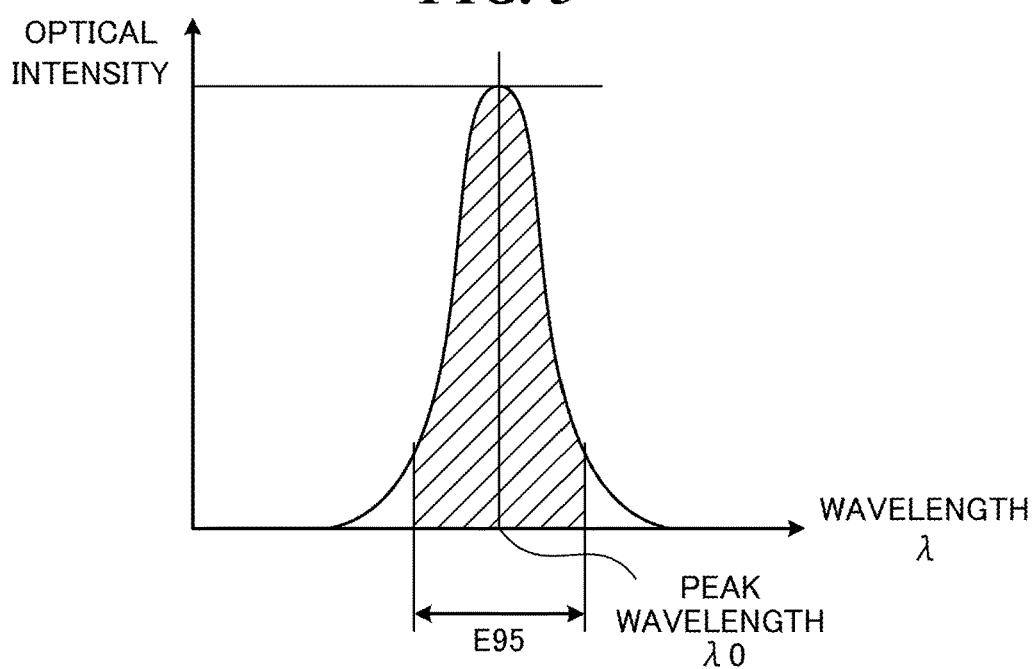
FIG. 3 explains an example of a definition of spectral width.

FIG. 3 explains an example of a definition of the spectral width. FIG. 3 shows a spectral shape of a pulse laser beam. As shown in FIG. 3, the full width of the range that covers 95% of the entire energy of the pulse laser beam with the peak wavelength $\lambda_0$ as a center is referred to as "spectral width E95" in this specification. The spectral width E95 may also be referred to as "spectral purity". The spectral width E95 corresponds to Δλ in the formula shown below. In the formula, $g(\lambda+\lambda_0)$ represents energy at wavelength $(\lambda+\lambda_0)$ in the spectral shape.

$$\frac{\int_{-\frac{\Delta\lambda}{2}}^{\frac{\Delta\lambda}{2}} g(\lambda+\lambda_0)d\lambda}{\int_{-\infty}^{\infty} g(\lambda+\lambda_0)d\lambda} = 0.95$$

1.6 Controller

With reference back to FIG. 1, the exposure apparatus 4 may include an exposure apparatus controller 40. The exposure apparatus controller 40 may perform controls such as moving an unillustrated wafer stage. The exposure apparatus controller 40 may output data on target pulse energy, data on target spectral width, and the trigger signal to the laser controller 30.

The laser controller 30 may set charging voltage of the charger 12 based on the data on the pulse energy received from the pulse energy measuring device 16c and the data on the target pulse energy received from the exposure apparatus controller 40. The pulse energy of the pulse laser beam outputted from the line narrowed laser apparatus may be controlled to approach the target pulse energy.

The laser controller 30 may include a spectral width controller 30a. The spectral width controller 30a may be configured as a program module loaded on a memory 1002 described below included in the laser controller 30.

The spectral width controller 30a may control the spectral width varying unit 15 via the driver 15d based on the data on the spectral width received from the spectral width detector 16d and the data on the target spectral width received from the exposure apparatus controller 40. Thus, the spectral width of the pulse laser beam outputted from the line narrowed laser apparatus may be controlled to approach the target spectral width.

The laser controller 30 may further include a suspension period measuring unit 30b. The suspension period measuring unit 30b may be configured as a program module loaded on the memory 1002 described below included in the laser controller 30.

The laser controller 30 may output the trigger signal received from the exposure apparatus controller 40 to the switch 13a in the pulse power module 13. The trigger signal received from the exposure apparatus controller 40 may further be inputted to the suspension period measuring unit 30b. The suspension period measuring unit 30b may measure a length of a suspension period of the line narrowed laser apparatus based on the trigger signal. The suspension period may be a period from receiving a pulse of the trigger signal until receiving the next pulse of the trigger signal.

Figure 4:
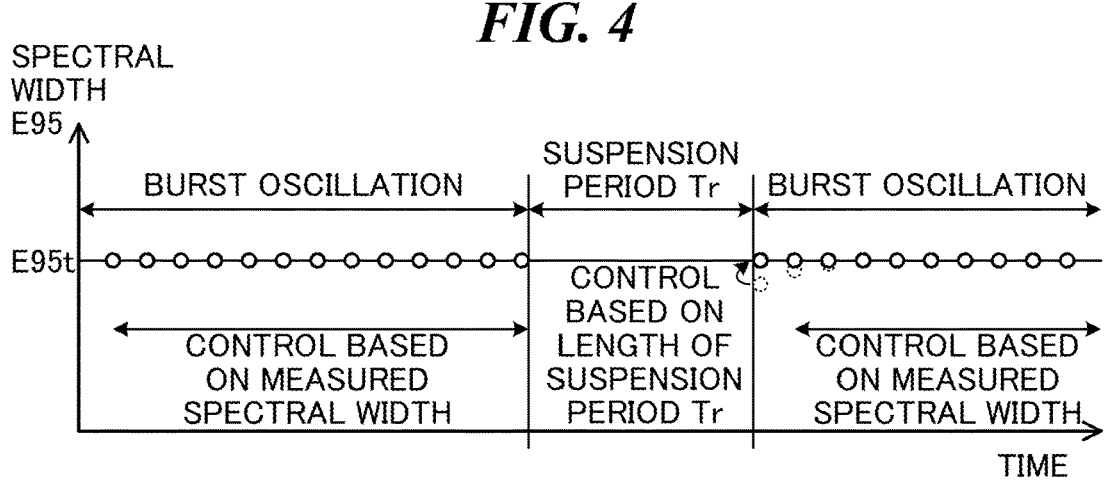
Figure 5:
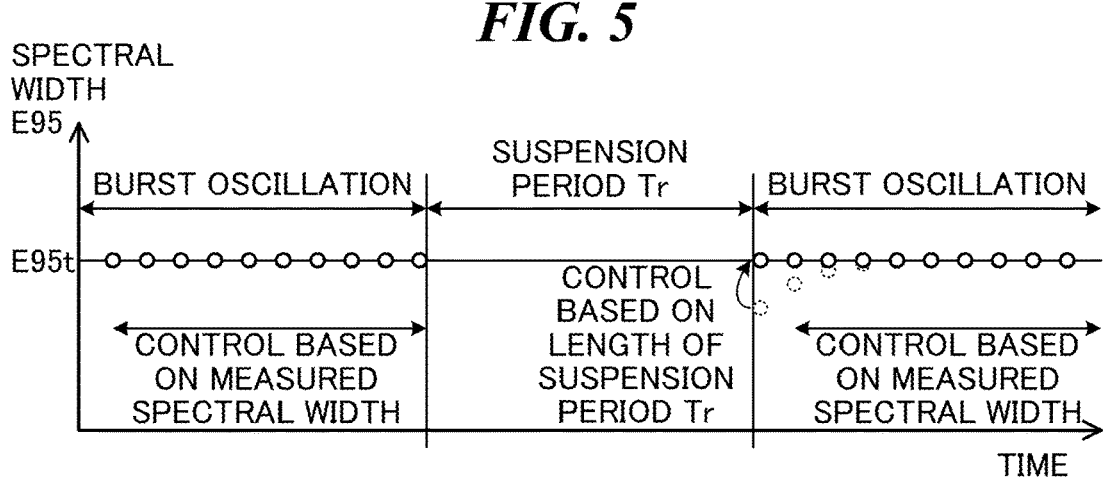

FIGS. 4 and 5 explain a basic concept of control of the spectral width performed by the spectral width controller 30a. Each of the small circles in FIGS. 4 and 5 correspond to an individual pulse of the pulse laser beam generated based on the trigger signal. The line narrowed laser apparatus may alternately repeat performing a burst oscillation with a repetition frequency equal to or higher than a predetermined threshold value and suspending the burst oscillation. The burst oscillation may be performed, for example, during an exposure of an individual chip region of a semiconductor wafer in the exposure apparatus 4. The burst oscillation may be suspended, for example, to move an unillustrated wafer stage after ending an exposure of a first chip region and before starting an exposure of a second region, or to exchange a semiconductor wafer mounted on the wafer stage. While exchanging the semiconductor wafer, an adjusting oscillation described below may be performed.

During the burst oscillation, the spectral width varying unit 15 may be controlled based on the data on the spectral width received from the spectral width detector 16d described above and the data on the target spectral width received from the exposure apparatus controller 40.

During the suspension period suspending the burst oscillation, the data on the spectral width may not be available from the spectral width detector 16d. If a control value for the spectral width varying unit 15 is not changed after ending the previous burst oscillation and before starting the next burst oscillation, the spectral width may shift at the start of the next burst oscillation. Small circles drawn with broken lines in FIGS. 4 and 5 represent such shift in the spectral width. The shift in the spectral width may cause change in focusing performance in the exposure apparatus 4, which may affect quality of exposure.

The shift in the spectral width during the suspension period suspending the burst oscillation may be caused by a change in temperature of optical elements during the suspension period suspending the burst oscillation to change characteristics of the optical elements. Amount of change in the spectral width may be different according to the length of the suspension period. For example, if the length of the suspension period Tr is relatively short as shown in FIG. 4, the amount of change in the spectral width may be relatively small. If the length of the suspension period Tr is relatively long as shown in FIG. 5, the amount of change in the spectral width may be relatively large.

Figure 6:
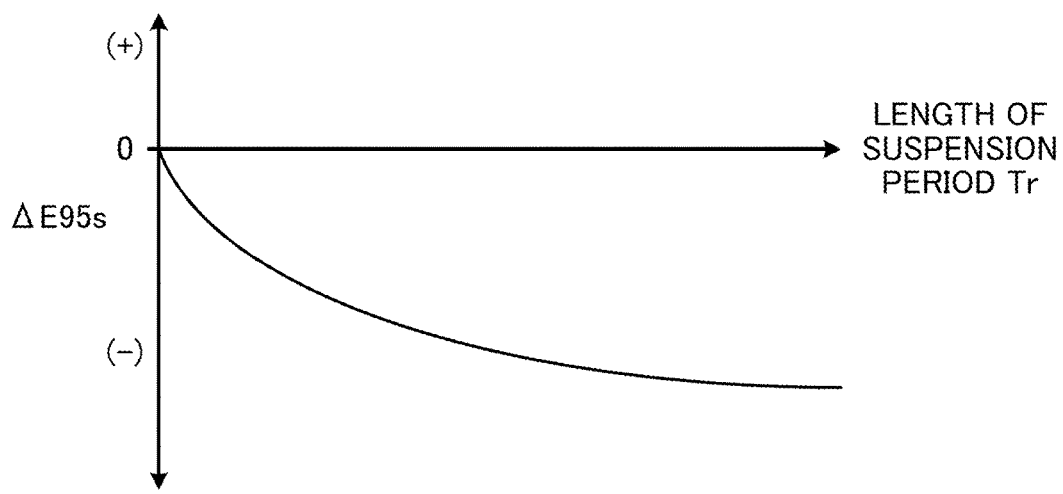
FIG. 6 shows an example of a relation of an amount of change $\Delta E95s$ in the spectral width to a length of a suspension period Tr.

FIG. 6 shows an example of a relation of the amount of change ΔE95s in the spectral width to the length of the suspension period Tr. The relation of the amount of change ΔE95s in the spectral width to the length of the suspension period Tr may be similar to a damping function with a first order lag.

Thus, the spectral width controller 30a may control the spectral width varying unit 15 after ending the previous burst oscillation and before starting the next burst oscillation. This control may compensate the amount of change ΔE95s in the spectral width according to the length of the suspension period Tr. As shown by the circles drawn with solid lines in FIGS. 4 and 5, the pulse laser beam at a spectral width around the target spectral width E95t may thus be outputted from the time of starting the next burst oscillation.

1.7 Operation

Figure 7:
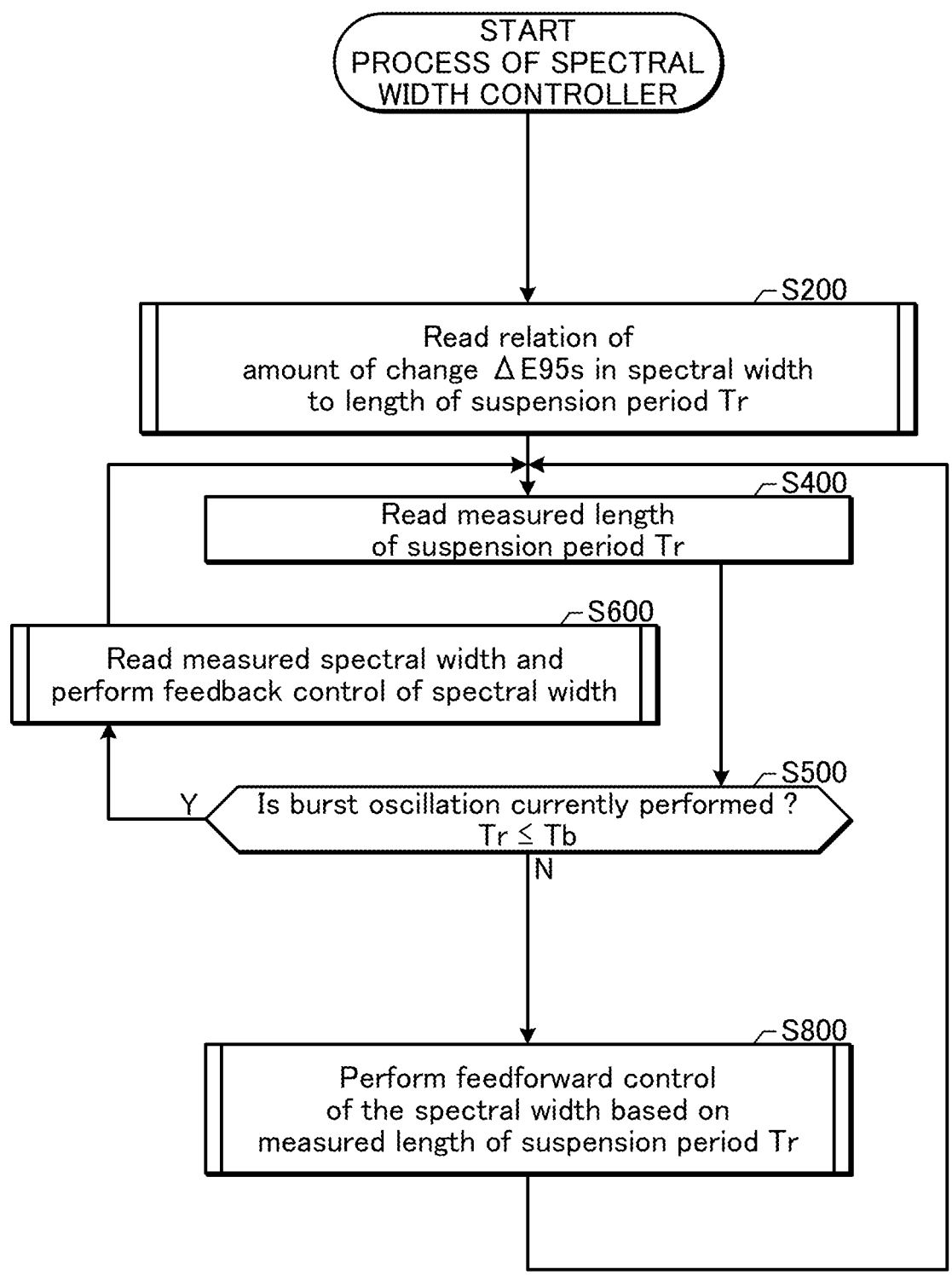
FIG. 7 is a flowchart showing a process of control of the spectral width performed by the spectral width controller 30a shown in FIG. 1.
Figure 8:
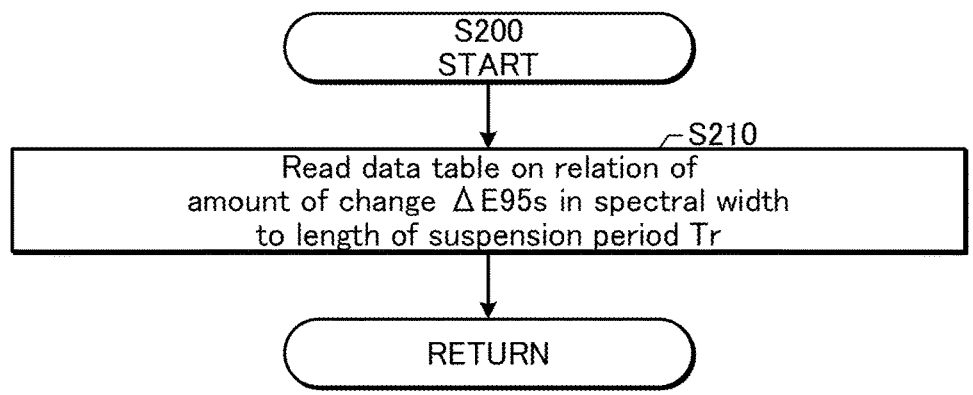
FIG. 8 is a flowchart showing a subroutine of a process of a part of the flowchart shown in FIG. 7.
Figure 9:
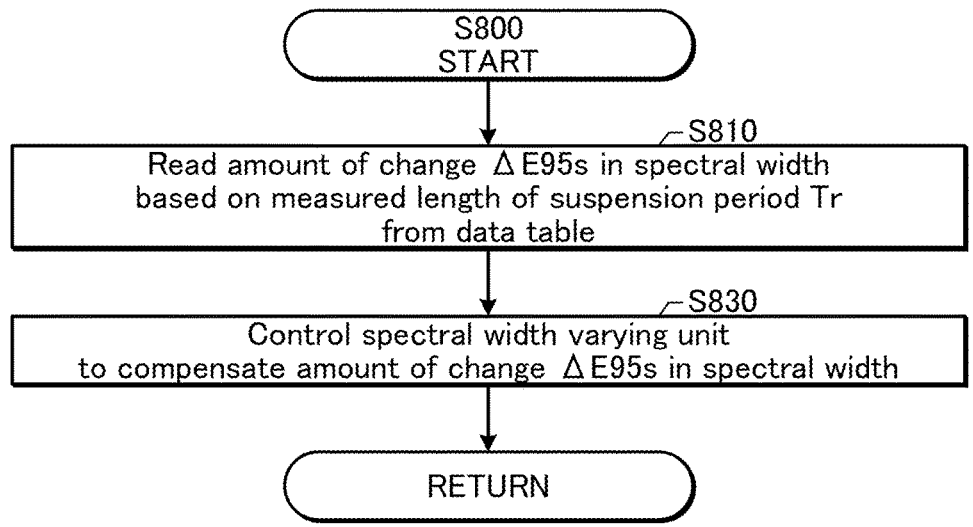
FIG. 9 is a flowchart showing a subroutine of a process of another part of the flowchart shown in FIG. 7.
Figure 10:
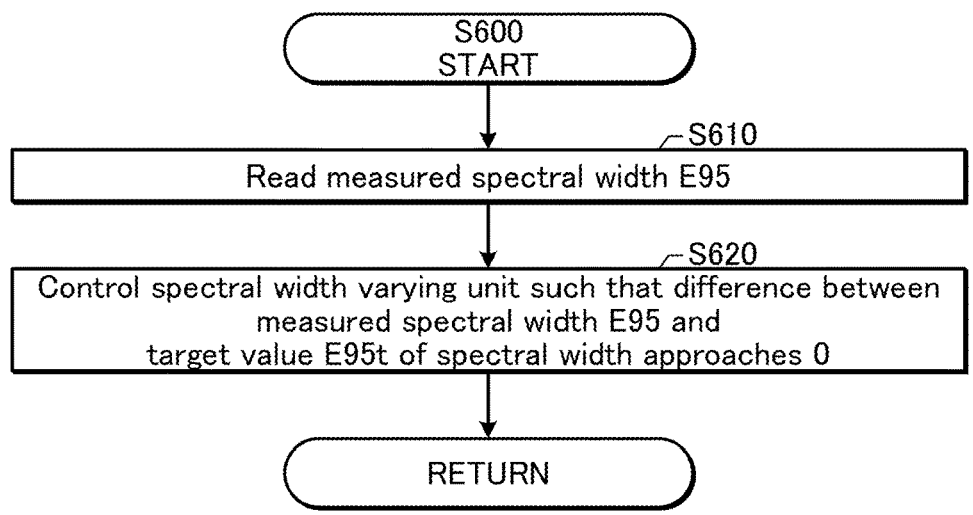
FIG. 10 is a flowchart showing a subroutine of a process of another part of the flowchart shown in FIG. 7.

FIG. 7 is a flowchart showing a process of control of the spectral width performed by the spectral width controller 30a shown in FIG. 1. FIGS. 8 to 10 are flowcharts each showing a subroutine of a process of a part of the flowchart shown in FIG. 7. The spectral width controller 30a may perform control in the suspension period suspending the burst oscillation (S800) and control in the period of burst oscillation (S600) as follows.

Firstly, at S200 in FIG. 7, the spectral width controller 30a may read data showing the relation of the amount of change ΔE95s in the spectral width to the length of the suspension period Tr from an unillustrated storage device. The relation of the amount of change ΔE95s in the spectral width to the length of the suspension period Tr may be similar to a damping function with a first order lag described above with reference to FIG. 6.

With reference to FIG. 8 showing the subroutine of S200, the spectral width controller 30a may read, at S210, a data table on the relation of the amount of change ΔE95s in the spectral width to the length of the suspension period Tr.

FIG. 11 shows a structure of the data table on the relation of the amount of change ΔE95s in the spectral width to the length of the suspension period Tr. In the data table shown in FIG. 11, the amount of change ΔE95s in the spectral width may correspond one by one to the length of the suspension period Tr.

With reference back to FIG. 7, at S400 next to S200, the spectral width controller 30a may read the length of the suspension period Tr measured by the suspension period measuring unit 30b. As described above, the suspension period Tr may be a period from receiving a pulse of the trigger signal until receiving the next pulse of the trigger signal.

Next, at S500, the spectral width controller 30a may determine whether the burst oscillation is currently performed based on the measured length of the suspension period Tr. For example, if the length of the suspension period Tr is equal to or less than a predetermined threshold value Tb, the spectral width controller 30a may determine that the burst oscillation is currently performed (S500: YES), and proceed to S500. The predetermined threshold value Tb may be 0.01 seconds or more, 0.05 seconds or less. The predetermined threshold value Tb may be, for example, around 0.02 seconds. Namely, if the trigger signal is inputted at a repetition frequency of 50 Hz or more, the spectral width controller 30a may determine that the burst oscillation is currently performed.

If the length of the suspension period Tr is more than the predetermined threshold value Tb, the spectral width controller 30a may determine that the burst oscillation is not currently performed but suspended (S500: NO), and proceed to S800.

At S800, the spectral width controller 30a may control the spectral width varying unit 15 based on the measured length of the suspension period Tr. Namely, the spectral width controller 30a may perform feedforward control of the spectral width.

After S800, the spectral width controller 30a may return to S400 described above and repeat the subsequent process. If the suspension period Tr continues further, the spectral width controller 30a may further perform S800 to control the spectral width varying unit 15 at every measurement of a new value of the length of the suspension period Tr.

With reference to FIG. 9 showing the subroutine of S800, the spectral width controller 30a may firstly read, at S810, the amount of change ΔE95s in the spectral width corresponding to the measured length of the suspension period Tr from the data table. The spectral width controller 30a may then control, at S830, the spectral width varying unit 15 to compensate the amount of change ΔE95s in the spectral width. If the relation of the amount of change ΔE95s in the spectral width to the length of the suspension period Tr is similar to the damping function with a first order lag described above with reference to FIG. 6, compensating the amount of change ΔE95s in the spectral width may include expanding the spectral width. Namely, the spectral width varying unit 15 may be controlled to adjust the spectral width to a value larger than the spectral width, where the spectral width varying unit 15 is not controlled after ending the previous burst oscillation, by the absolute value |ΔLE95s| of E95s.

With reference back to FIG. 7, at S600, the spectral width controller 30a may control the spectral width varying unit 15 based on the measured spectral width. Namely, the spectral width controller 30a may perform feedback control of the spectral width.

After S600, the spectral width controller 30a may return to S400 described above and repeat the subsequent process. If the burst oscillation continues further, the spectral width controller 30a may further perform S600 to control the spectral width varying unit 15 at every measurement of a new value of the spectral width.

With reference to FIG. 10 showing the subroutine of S600, the spectral width controller 30a may firstly read, at S610, the measured spectral width E95. The spectral width controller 30a may then control, at S620, the spectral width varying unit 15 such that the difference between the measured spectral width E95 and the target value E95t of the spectral width approaches 0.

1.8 Problem

FIGS. 12 and 13 explain a problem to be solved by the present disclosure. In the comparative example described above, the spectral width at the time of starting the burst oscillation is controlled based on the length of the suspension period Tr from the time of ending the previous burst oscillation. However, the spectral width at the time of starting the burst oscillation may not necessarily be influenced by the length of the suspension period Tr alone.

For example, between the case where the previous burst oscillation has been performed at a low repetition frequency as shown in FIG. 12 and the case where the previous burst oscillation has been performed at a high repetition frequency as shown in FIG. 13, characteristics of the optical elements may be different even in the same length of the suspension period Tr. In the case where the previous burst oscillation has been performed at a low repetition frequency, as compared to the case where the previous burst oscillation has been performed at a high repetition frequency, the temperature of the optical element may not rise so high and the amount of change in the spectral width may be relatively small. In the case where the previous burst oscillation has been performed at a high repetition frequency, the amount of change in the spectral width may be relatively large. Calculating the amount of change ΔE958 in the spectral width based on the length of the suspension period Tr alone may lead to shift in the spectral width at the time of starting the next burst oscillation.

Even in the same repetition frequency in the burst oscillation, a long suspension period may reduce thermal load on the optical element and the amount of change in the spectral width may be relatively small. In contrast, even in the same repetition frequency in the burst oscillation, a short suspension period may not reduce the thermal load on the optical element and the amount of change in the spectral width may be relatively large.

In the embodiments described below, to solve the problem, the duty of the laser oscillation may be measured and the spectral width varying unit 15 may be controlled based on the measured duty.

2. Line Narrowed Laser Apparatus That Controls Spectral Width Based on Duty (First Embodiment)

2.1 Configuration

Figure 14:
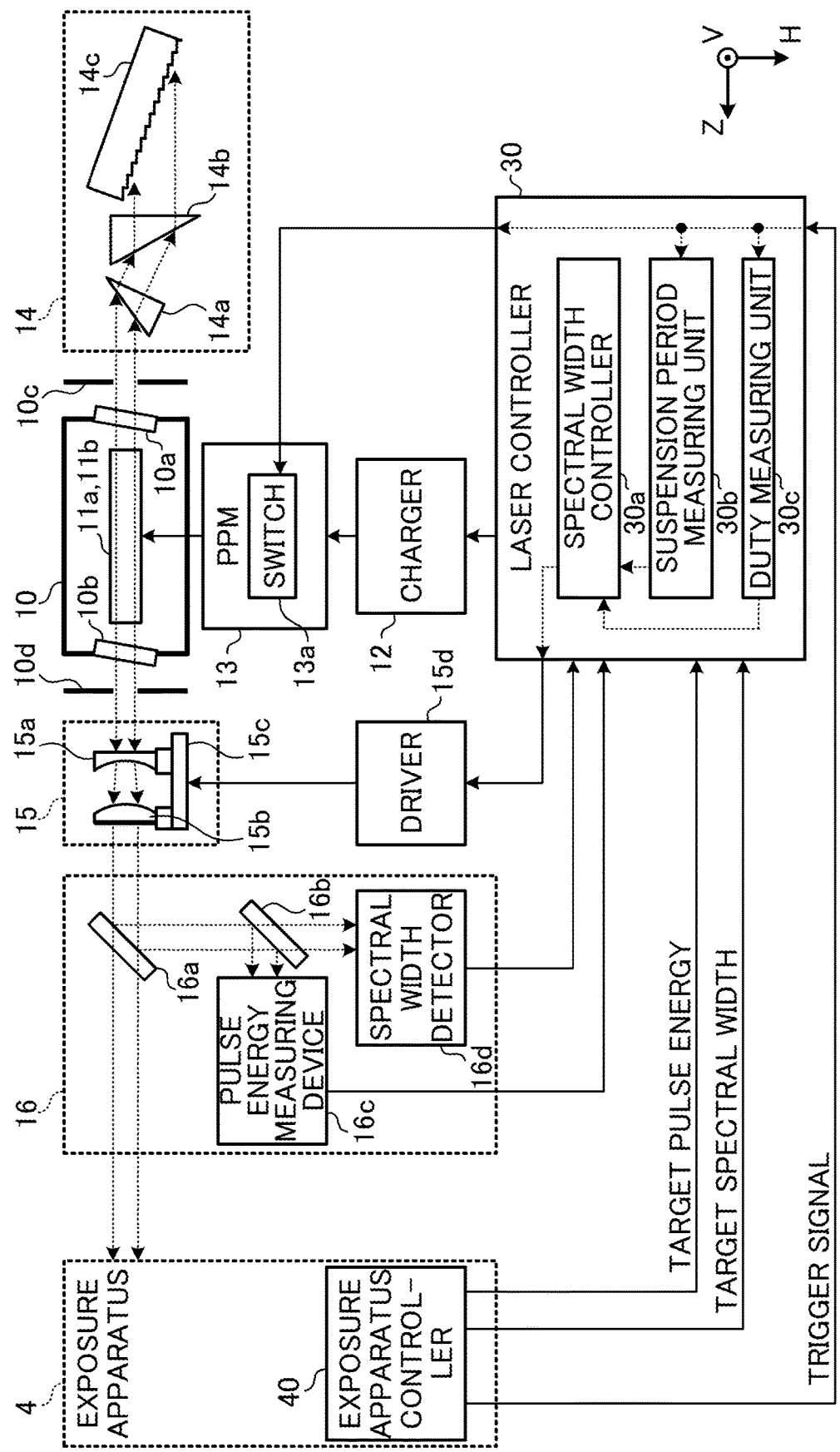
FIG. 14 schematically shows a configuration of a line narrowed laser apparatus according to a first embodiment of the present disclosure.

FIG. 14 schematically shows a configuration of a line narrowed laser apparatus according to a first embodiment of the present disclosure. In the first embodiment, the laser controller 30 of the line narrowed laser apparatus may include, in addition to the configuration of the comparative example described with reference to FIG. 1, a duty measuring unit 30c. The duty measuring unit 30c may be configured as a program module loaded on the memory 1002 described below included in the laser controller 30.

The duty measuring unit 30c may measure the duty of the pulse laser beam based on the trigger signal outputted from the exposure apparatus controller 40. The duty of the pulse laser beam may be, for example, a ratio of the actual number of pulses in a predetermined period to the number of pulses in the case where the laser oscillation is performed in the predetermined period at the maximum repetition frequency. The value of the duty thus measured may be outputted to the spectral width controller 30a.

Figures 15, 16:
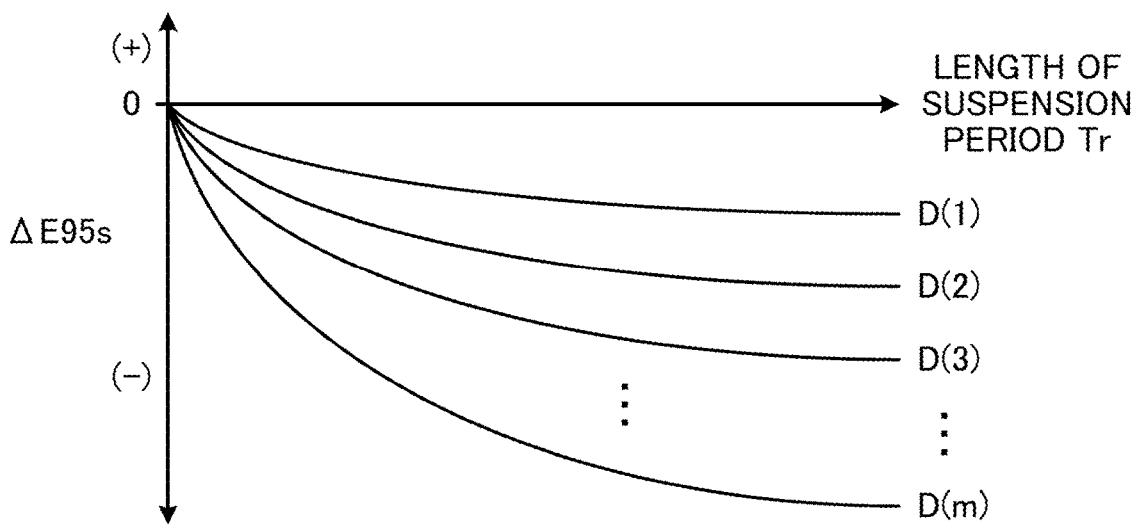
FIG. 15 shows a relation of the amount of change ΔE95s in the spectral width to the length of the suspension period Tr for each value of duty D in a previous burst oscillation.
FIG. 16 shows a structure of a data table on the relation of the amount of change ΔE95s in the spectral width to the duty D in the previous burst oscillation and the length of the suspension period Tr.

FIG. 15 shows a relation of the amount of change ΔE95s in the spectral width to the length of the suspension period Tr for each value of the duty D in the previous burst oscillation. For each value of the duty D, the relation of the amount of change ΔE95s in the spectral width to the length of the suspension period Tr may be similar to the damping function with a first order lag. The amount of change ΔE95s in the spectral width may be small in a low duty D, and the amount of change ΔE95s in the spectral width may be large in a high duty D. Thus, the spectral width varying unit 15 may be controlled according to the combination of the duty D and the length of the suspension period Tr. This may allow the spectral width at the time of starting the next burst oscillation to be adjusted at high accuracy.

FIG. 16 shows a structure of a data table on the relation of the amount of change ΔE958 in the spectral width to the duty D in the previous burst oscillation and the length of the suspension period Tr. In the data table shown in FIG. 16, the combination of the duty D and the length of the suspension period Tr may correspond one by one to the amount of change ΔE95s in the spectral width.

2.2 Operation

Figure 17:
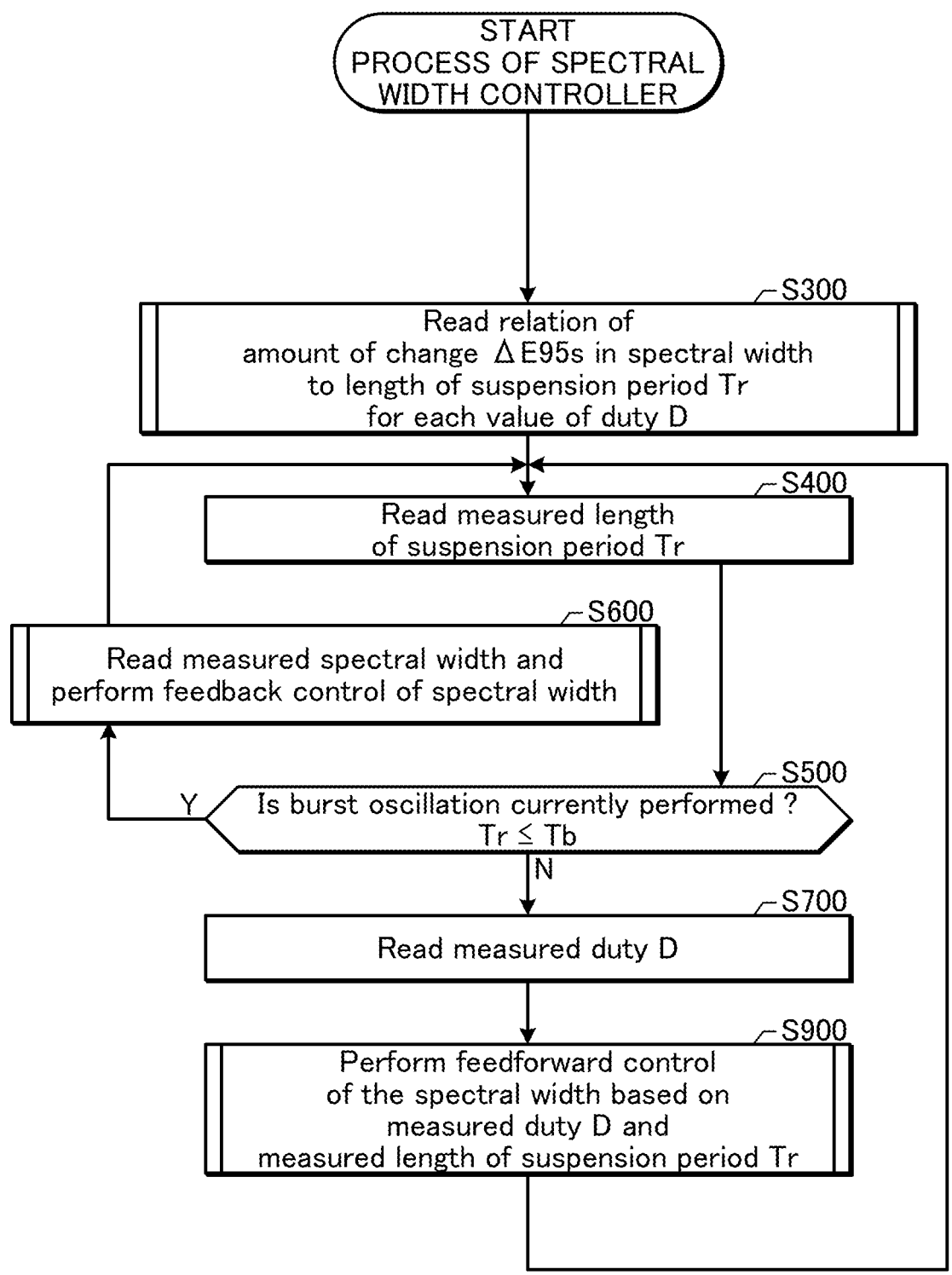
FIG. 17 is a flowchart showing a process of control of the spectral width performed by a spectral width controller 30a shown in FIG. 14.
Figure 18:
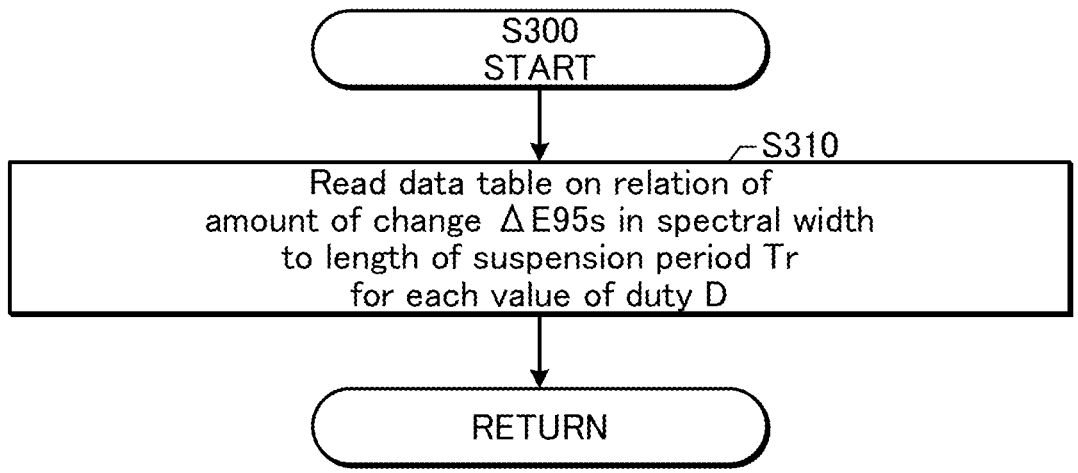
FIG. 18 is a flowchart showing a subroutine of a process of a part of the flowchart shown in FIG. 17.
Figure 19:
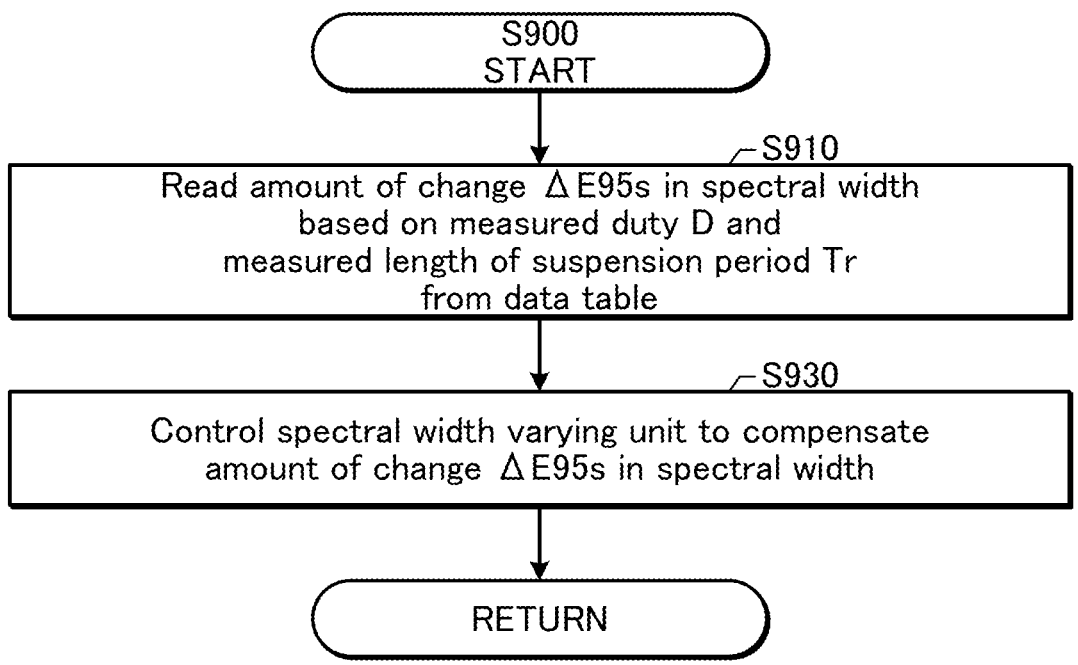
FIG. 19 is a flowchart showing a subroutine of a process of another part of the flowchart shown in FIG. 17.

FIG. 17 is a flowchart showing a process of control of the spectral width performed by the spectral width controller 30a shown in FIG. 14. FIGS. 18 and 19 are flowcharts each showing a subroutine of a process of a part of the flowchart shown in FIG. 17. The spectral width controller 30a may perform control in the suspension period suspending the burst oscillation (8900) based on the duty of the pulse laser beam as follows.

Firstly, at S300 in FIG. 17, the spectral width controller 30a may read data on the relation of the amount of change ΔE95s in the spectral width to the length of the suspension period Tr for each value of the duty D, from an unillustrated storage device.

The subroutine of S300 shown in FIG. 18 may be substantially the same as the subroutine of S200 described with reference to FIG. 8, except for reading the data for each value of the duty.

With reference back to FIG. 17, the process next to S300, from S400 to S500, may be substantially the same as that in the comparative example described with reference to FIG. 7.

If the burst oscillation is currently performed at S500 (S500: YES), the spectral width controller 30a may proceed to S600. The process of S600 may be substantially the same as that in the comparative example described with reference to FIG. 7.

If the burst oscillation is not currently performed at S500 (S500: NO), the spectral width controller 30a may proceed to S700.

At S700, the spectral width controller 30a may read the measured value of the duty D from the duty measuring unit 30c.

Next, at S900, the spectral width controller 30a may control the spectral width varying unit 15 based on the measured duty D and the measured length of the suspension period Tr. Namely, the spectral width controller 30a may perform feedforward control of the spectral width.

After S900, the spectral width controller 30a may return to S400 described above and repeat the subsequent process.

S910 in the subroutine of S900 shown in FIG. 19 may be different from S810 in FIG. 9 in that the measured duty is used. In other aspect, the subroutine of S900 in FIG. 19 may be substantially the same as the subroutine of S800 described with reference to FIG. 9. The process of S930 in FIG. 19 may be substantially the same as S230 in FIG. 9.

Figure 20:
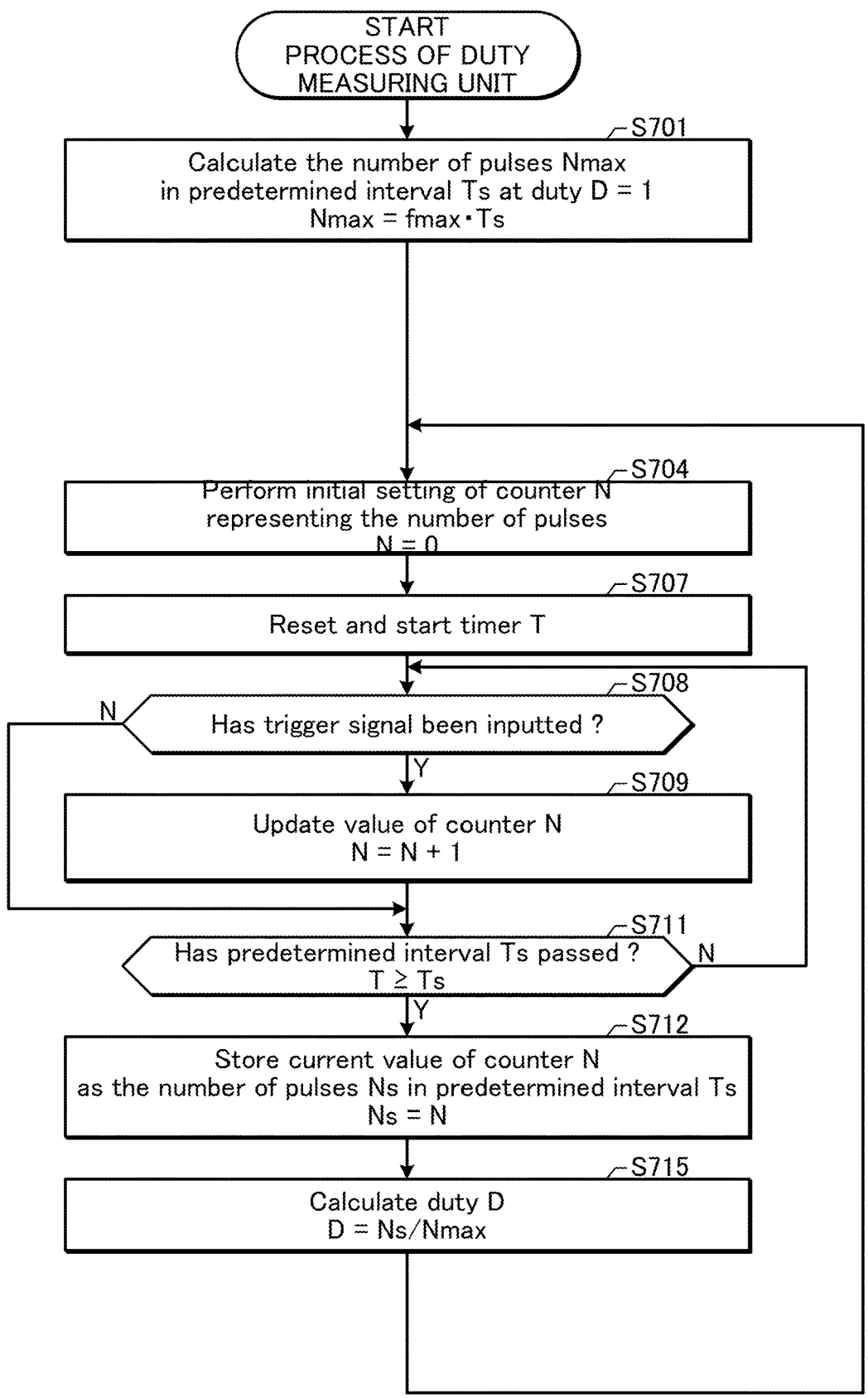
FIG. 20 is a flowchart showing a process of measuring the duty performed by a duty measuring unit 30c shown in FIG. 14.

FIG. 20 is a flowchart showing a process of measuring the duty performed by the duty measuring unit 30c shown in FIG. 14. The process of measuring the duty may be performed by the duty measuring unit 30c, separately from the control of the spectral width described above with reference to FIG. 17. The duty measuring unit 30c may measure the duty of the pulse laser beam in the following process. The process to measure the duty of the pulse laser beam may be performed during the period of burst oscillation. The process may not be performed during the period suspending the burst oscillation.

Firstly, at S701, the duty measuring unit 30c may calculate the number of pulses Nmax in a case where the laser oscillation is performed in a predetermined interval Ts at a duty D of 1 by the following formula.

$$Nmax = fmax \cdot Ts$$

Here, fmax may be the maximum repetition frequency of the line narrowed laser apparatus.

Next, at S704, the duty measuring unit 30c may perform an initial setting of the value of a counter N representing the number of pulses to 0.

Next, at S707, the duty measuring unit 30c may reset and start a timer T.

Next, at S708, the duty measuring unit 30c may determine whether the trigger signal has been inputted. If the trigger signal has been inputted (S708: YES), the duty measuring unit 30c may proceed to S709.

At S709, the duty measuring unit 30c may add 1 to the current value of the counter N to update the value of the counter N. After S709, the duty measuring unit 30c may proceed to S711.

If the trigger signal has not been inputted (S708: NO), the duty measuring unit 30c may skip S709 and proceed to S711. Namely, the value of the counter N may not be updated.

At S711, the duty measuring unit 30c may compare the value of the timer T with the predetermined interval Ts, to determine whether the predetermined interval Ts has passed since the timer T started. Here, the predetermined interval Ts may be, for example, 1 minute or more, 10 minutes or less.

If the predetermined interval Ts has not passed (S711: NO), the duty measuring unit 30c may return to S708 described above to determine whether a new trigger signal has been inputted.

If the predetermined interval Ts has passed (S711: YES), the duty measuring unit 30c may proceed to S712.

At S712, the duty measuring unit 30c may store the current value of the counter N in an unillustrated storage device as the number of pulses Ns in the predetermined interval Ts.

Next, at S715, the duty measuring unit 30c may calculate the duty D by the following formula.

$$D = Ns/Nmax$$

As described above, the ratio of the actual number of pulses in the predetermined interval Ts to the number of pulses in the case where the laser oscillation is performed in the predetermined interval Ts at the maximum repetition frequency may be calculated as the duty D.

2.3 Details of Spectral Width Varying Unit

Figure 21A:
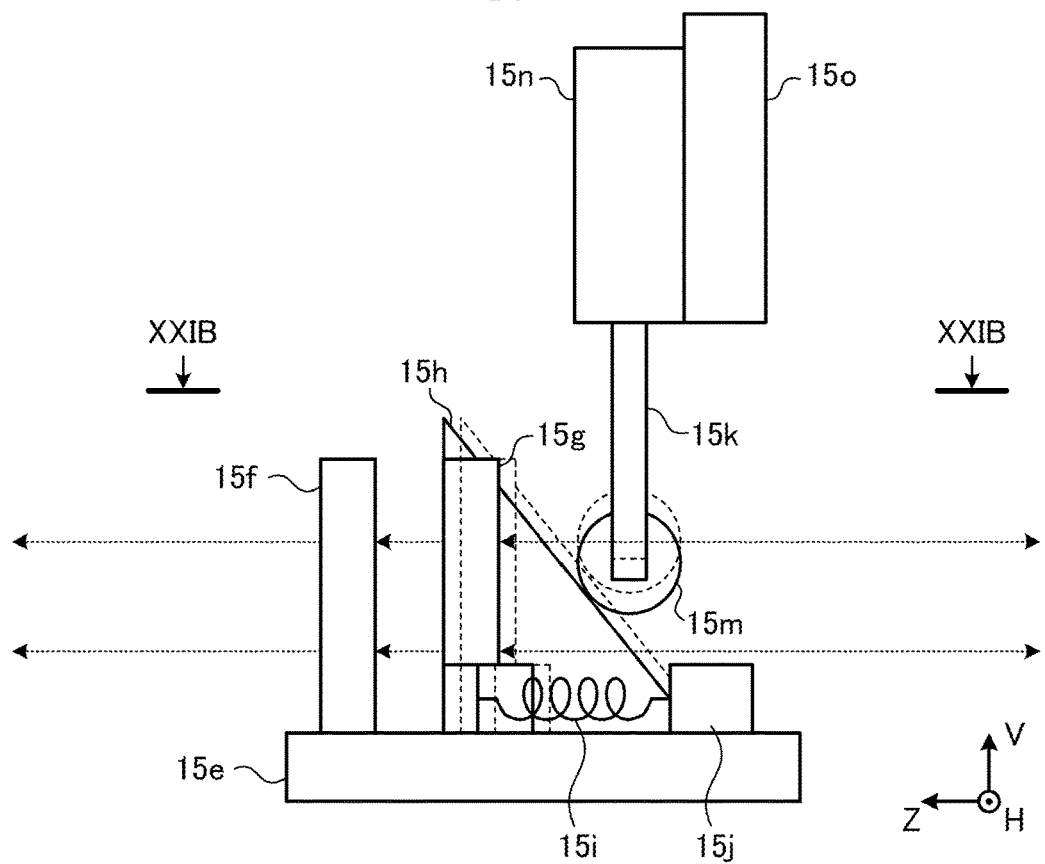
FIG. 21A schematically shows a configuration of a spectral width varying unit 15 shown in FIG. 14.
Figure 21B:
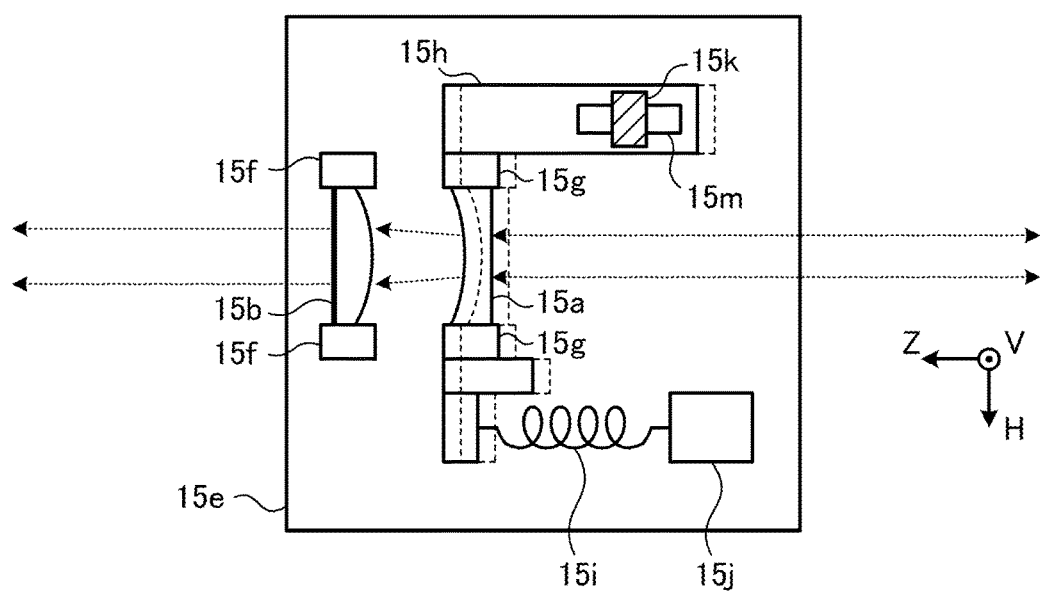
FIG. 21B schematically shows the configuration of the spectral width varying unit 15 shown in FIG. 14.

FIGS. 21A and 21B schematically show a configuration of the spectral width varying unit 15 shown in FIG. 14. FIG. 21A shows the spectral width varying unit 15 as viewed in the −H direction. FIG. 21B shows a section at line XXIB-XXIB in FIG. 21A and structures positioned lower than the section as viewed in the −V direction.

The spectral width varying unit 15 may include the plano-concave cylindrical lens 15a and the plane-convex cylindrical lens 15b. The plano-convex cylindrical lens 15b may be fixed to a plate 15e by a holder 15f.

The plano-concave cylindrical lens 15a may be fixed to a holder 15g. An unillustrated guide member may allow the holder 15g to move in the Z direction and the −Z direction relative to the plate 15e without changing the posture of the holder 15g.

A slope member 15h and one end of a spring 15i may be fixed to the holder 15g. The other end of the spring 15i may be fixed to a fixing member 15j. The fixing member 15j may be fixed to the plate 15e. The holder 15g may be continuously pulled by the spring 15i in the −Z direction.

A wheel 15m attached to an end of a rod 15k may be in contact with a slant face of the slope member 15h. A linear motor 15n may cause the rod 15k with the wheel 15m to move back and forth in the V direction and the −V direction. The linear motor 15n may be fixed to a fixing member 15o at a fixed position relative to the plate 15e.

The wheel 15m moving in the −V direction may push the slope member 15h in the Z direction. The holder 15g with the plano-concave cylindrical lens 15a may thus move in the Z direction.

The wheel 15m moving in the V direction may allow the holder 15g with the plano-concave cylindrical lens 15a to move in the −Z direction by being pulled by the spring 15i in the −Z direction.

The plano-concave cylindrical lens 15a may thus be movable in the Z direction and the direction.

Here, the plano-convex cylindrical lens 15b may be coated with the partially reflective film, and the spectral width varying unit 15 may function as an output coupling mirror. However, the present disclosure is not limited to this configuration. An output coupling mirror may further be provided and a spectral width varying unit may be provided in the optical resonator.

3. Line Narrowed Laser Apparatus That Updates Data by Adjusting Oscillation (Second Embodiment)

3.1 Configuration

Figure 22:
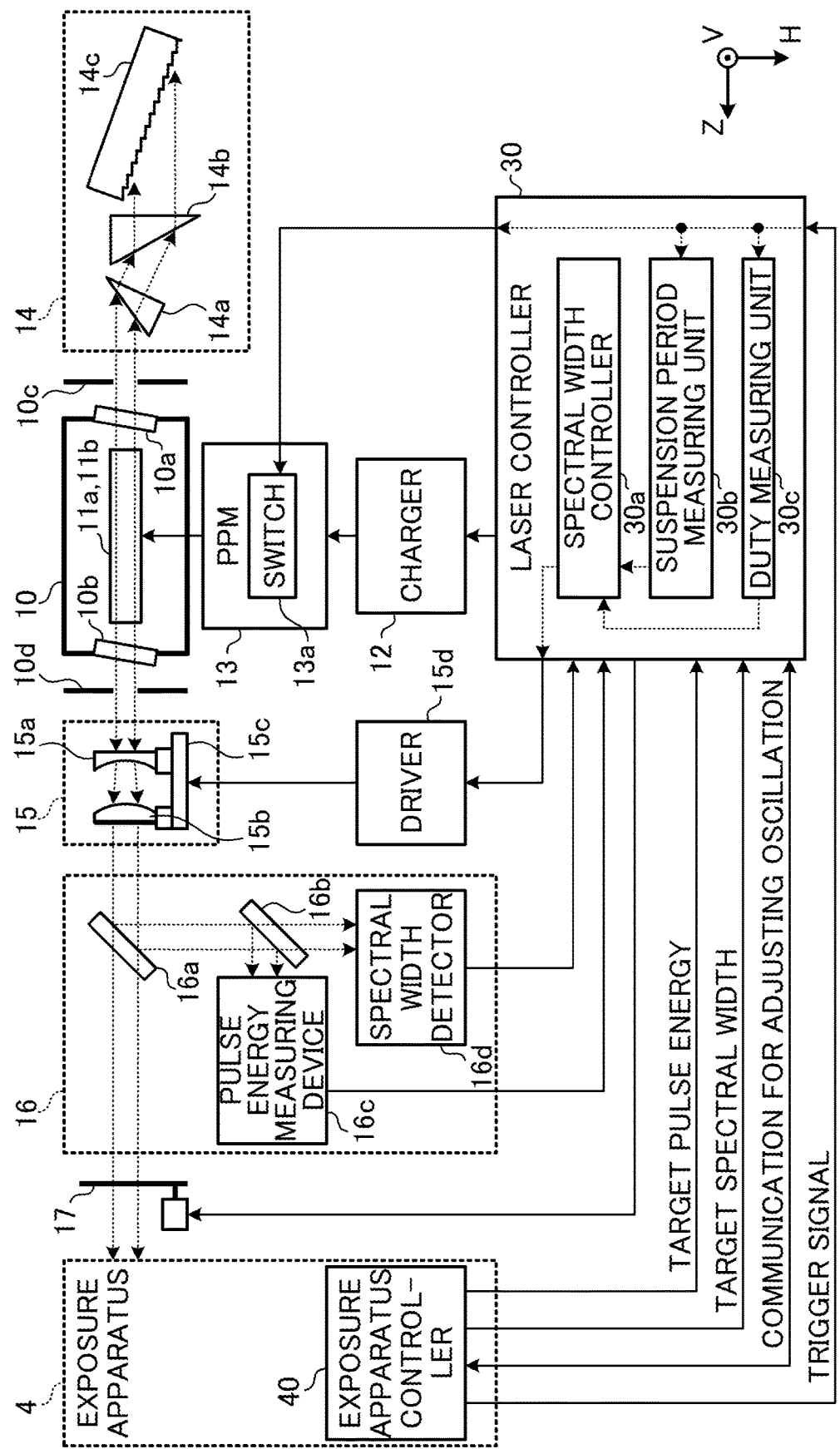
FIG. 22 schematically shows a configuration of a line narrowed laser apparatus according to a second embodiment of the present disclosure.

FIG. 22 schematically shows a configuration of a line narrowed laser apparatus according to a second embodiment of the present disclosure. The relation of the amount of change ΔE95s in the spectral width to the value of the duty D and the length of the suspension period Tr described in the first embodiment may change with an operation status or the like of the line narrowed laser apparatus. The second embodiment may perform an adjusting oscillation to acquire and update data on the relation of the amount of change ΔE95s in the spectral width to the value of the duty D and the length of the suspension period Tr.

In the second embodiment, the line narrowed laser apparatus may include, in addition to the configuration of the first embodiment described with reference to FIG. 14, a shutter 17 which is capable of opening and closing. The shutter 17 may be in a closed state during the adjusting oscillation to suppress inputting the pulse laser beam to the exposure apparatus 4.

Further, in the second embodiment, a signal line may be connected between the laser controller 30 and the exposure apparatus controller 40 to send or receive control signals for the adjusting oscillation.

3.2 Operation

3.2.1 Main Flow

Figure 23:
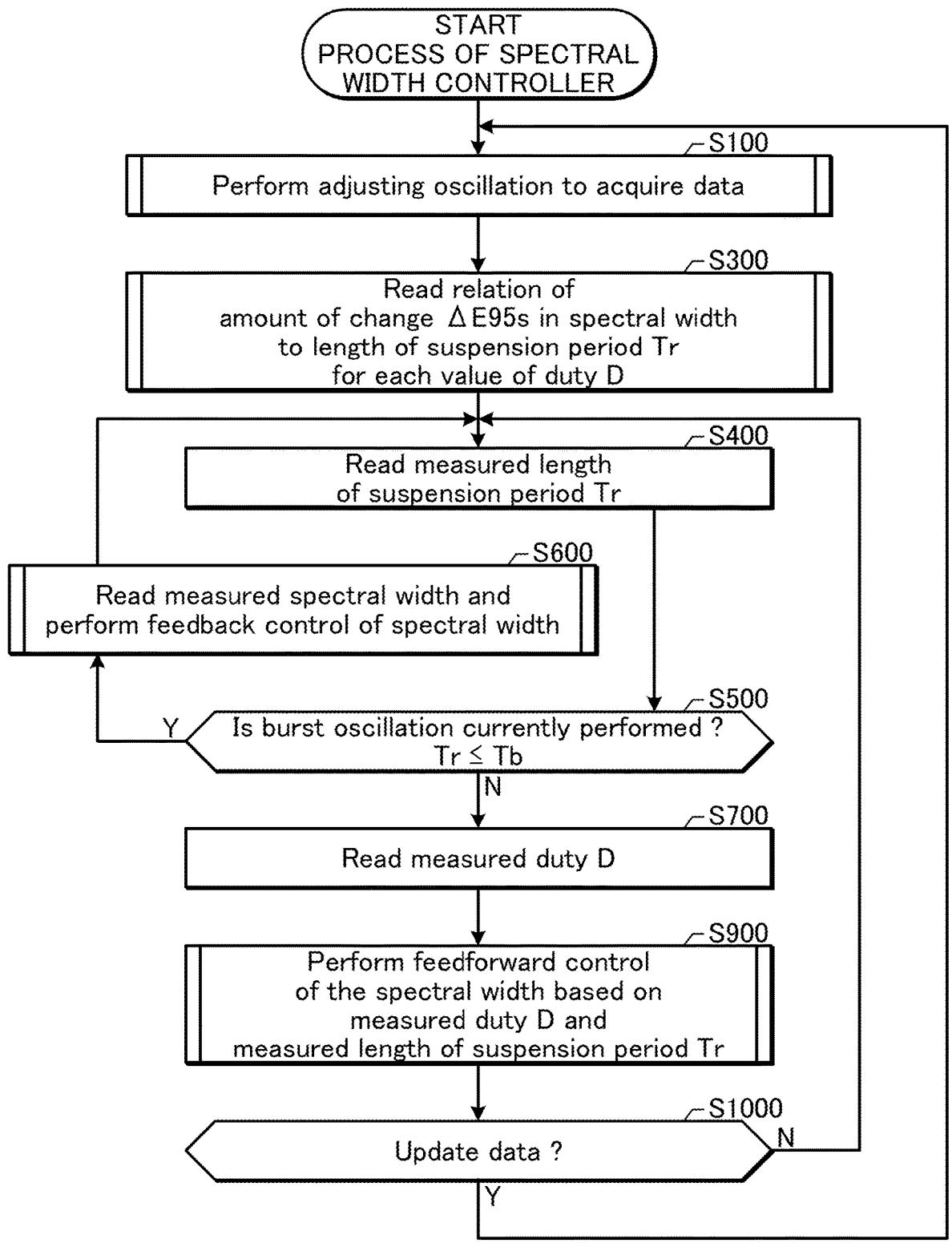
FIG. 23 is a flowchart showing a process of a spectral width controller 30a shown in FIG. 22.

FIG. 23 is a flowchart showing a process of the spectral width controller 30a shown in FIG. 22. As described below, the spectral width controller 30a may perform, in addition to the control of the spectral width, the adjusting oscillation to update the data.

Firstly, at S100, the spectral width controller 30a may perform the adjusting oscillation, to update the data on the relation of the amount of change ΔE95s in the spectral width to the value of the duty D and the length of the suspension period Tr.

Details of the process of S100 will be described below with reference to FIG. 24.

The process next to S100, from S300 to S900, may be substantially the same as that in the first embodiment described with reference to FIG. 17.

After S900, at S1000, the spectral width controller 30a may determine whether the data is to be updated by the adjusting oscillation. For example, the data may be updated if a predetermined period has passed since the previous update. Alternatively, the data may be updated if an absolute value of the difference between the target spectral width and a spectral width at the time of starting the burst oscillation exceeds a predetermined value.

If the data is to be updated (S1000: YES), the spectral width controller 30a may return to S100 described above to perform the adjusting oscillation. If the data is not to be updated (S1000: NO), the spectral width controller 30a may return to S400 described above, to continue the control of the spectral width using the data that has been measured.

3.2.2 Details of Adjusting Oscillation

Figure 24:
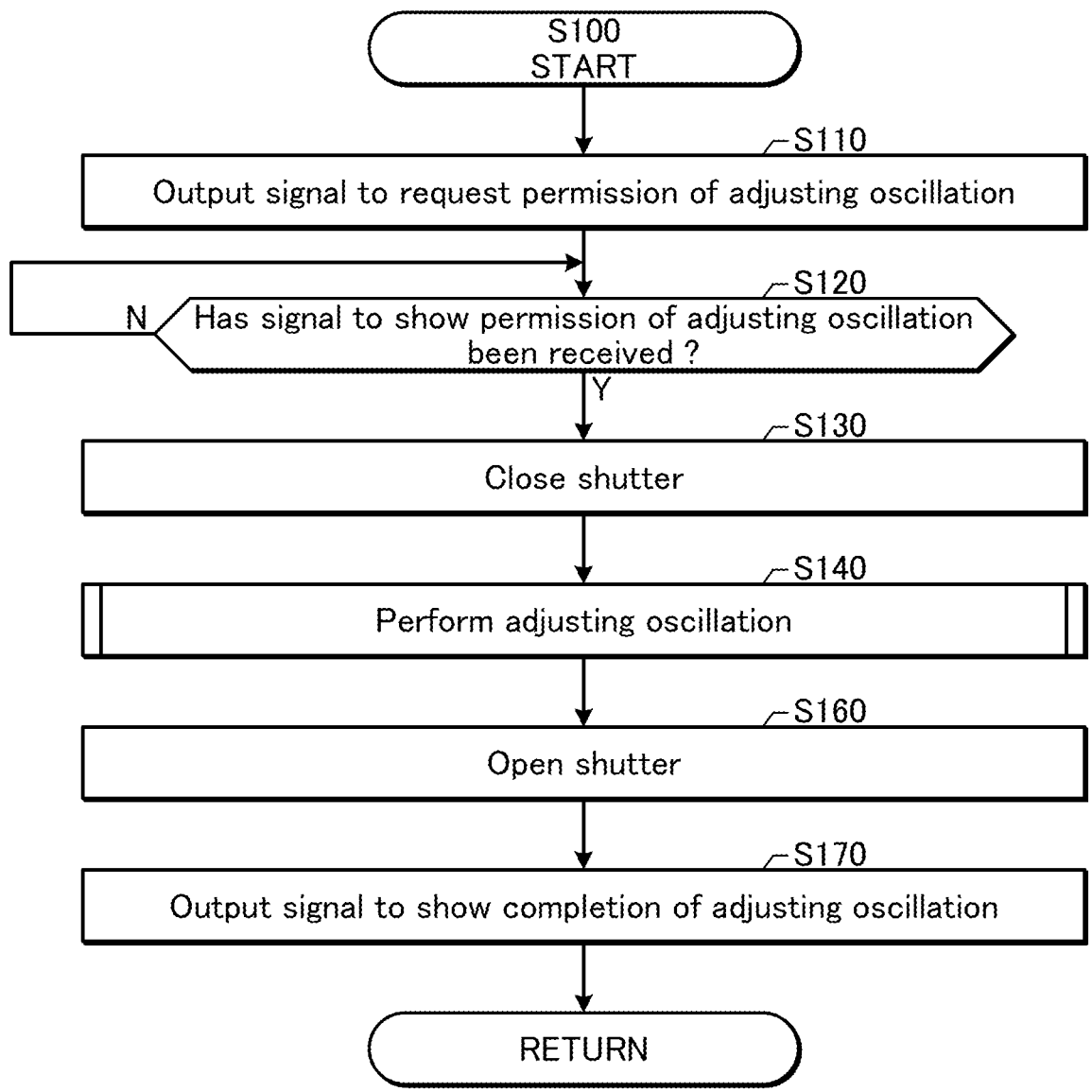
FIG. 24 is a flowchart showing details of a process of an adjusting oscillation shown in FIG. 23.

FIG. 24 is a flowchart showing details of a process of the adjusting oscillation shown in FIG. 23. The process shown in FIG. 24 may be performed by the spectral width controller 30a as a subroutine of S100 shown in FIG. 23.

Firstly, at S110, the spectral width controller 30a may output a signal to request permission of the adjusting oscillation to the exposure apparatus controller 40.

Next, at S120, the spectral width controller 30a may determine whether it has received a signal to show permission of the adjusting oscillation from the exposure apparatus controller 40. If the spectral width controller 30a has not received the signal to show permission of the adjusting oscillation (S120: NO), the spectral width controller 30a may wait until receiving the signal to show permission of the adjusting oscillation. If the spectral width controller 30a has received the signal to show permission of the adjusting oscillation (S120: YES), the spectral width controller 30a may proceed to S130. The exposure apparatus controller 40 may stop the control of the wafer stage or the like during the adjusting oscillation.

At S130, the spectral width controller 30a may close the shutter 17.

Next, at S140, the spectral width controller 30a may perform the adjusting oscillation to measure the relation of the amount of change ΔE95s in the spectral width to the duty D and the length of the suspension period Tr.

Details of the process of S140 will be described below with reference to FIG. 25.

After the adjusting oscillation ends, at S160, the spectral width controller 30a may open the shutter 17.

Next, at S170, the spectral width controller 30a may output a signal to show completion of the adjusting oscillation to the exposure apparatus controller 40.

After S170, the spectral width controller 30a may end the process of this flowchart.

Figure 25:
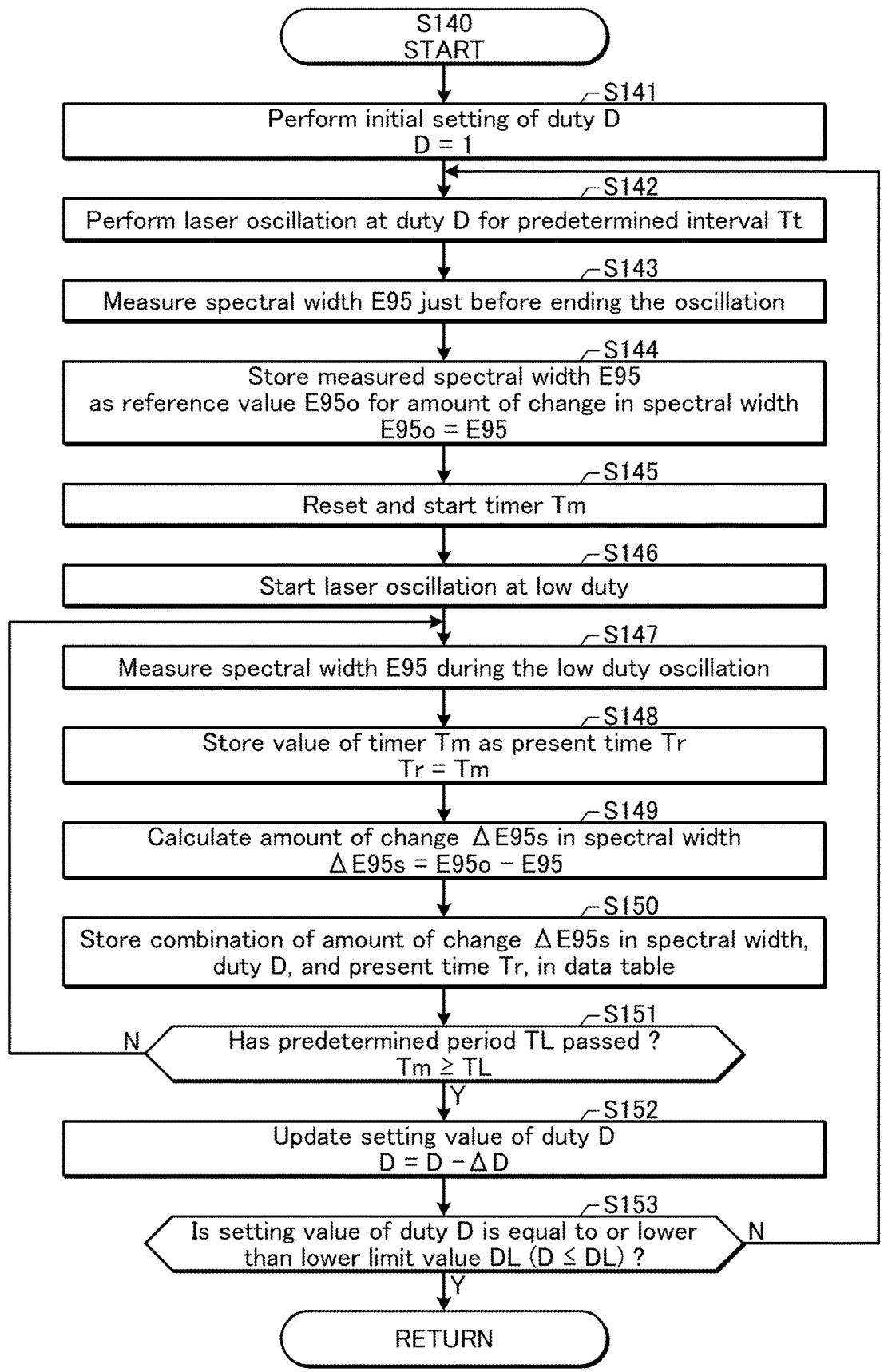
FIG. 25 is a flowchart showing details of the process of the adjusting oscillation shown in FIG. 24.

FIG. 25 is a flowchart showing details of the process of the adjusting oscillation shown in FIG. 24. The process shown in FIG. 25 may be performed by the spectral width controller 30a as a subroutine of S140 shown in FIG. 24. As described below, the spectral width controller 30a may measure the relation of the amount of change ΔE95s in the spectral width to the length of the suspension period Tr, with several values of the duty D.

Firstly, at S141, the spectral width controller 30a may perform an initial setting of the value of the duty D to 1.

Next, at S142, the spectral width controller 30a may generate the trigger signal for a predetermined interval Tt at the duty D having been set, to cause laser oscillation. Here, the spectral width controller 30a may perform the feedback control of the spectral width.

Next, at S143, the spectral width controller 30a may measure the spectral width E95 just before ending the oscillation of S142.

Next, at S144, the spectral width controller 30a may store the measured value of the spectral width E95 just before ending the oscillation of S142, as a reference value E950 for the amount of change in the spectral width, in an unillustrated storage device.

Next, at S145, the spectral width controller 30a may reset and start a timer T.

Next, at S146, the spectral width controller 30a may start outputting the trigger signal at a predetermined low duty to cause laser oscillation in a low repetition frequency. Here, the spectral width controller 30a may not perform the feedback control of the spectral width. The predetermined low duty may be a duty in which the laser oscillation may not substantially affect the amount of change in the spectral width. For example, if the maximum repetition frequency is 6000 Hz, the predetermined low duty may correspond to a repetition frequency of 100 Hz.

Next, at S147, the spectral width controller 30a may measure the spectral width E95 during the oscillation at the predetermined low duty.

Next, at S148, the spectral width controller 30a may store the value of the timer Tm at the time of measuring the spectral width E95 as a present time Tr in an unillustrated storage device.

Next, at S149, the spectral width controller 30a may calculate the amount of change ΔE95s in the spectral width by the following formula.

$$\Delta E95s = E95o - E95$$

As shown in this formula, the amount of change ΔE95s in the spectral width may be the difference between the reference value E95o for the amount of change in the spectral width measured at S144 and the spectral width E95 measured at S147.

Next, at S150, the spectral width controller 30a may store the combination of the amount of change ΔE95s in the spectral width, the duty D, and the present time Tr, in the data table.

Next, at S151, the spectral width controller 30a may determine whether a predetermined period TL has passed since the timer Tm started.

If the predetermined period TL has not passed (S151: NO), the spectral width controller 30a may return to S147 described above and repeat the measurement of the spectral width E95 during the oscillation at the predetermined low duty.

If the predetermined period TL has passed (S151: YES), the spectral width controller 30a may proceed to S152.

At S152, the spectral width controller 30a may subtract a predetermined positive value AD from the value of the duty D to update the setting value of the duty D to a value leer than the current value.

Next, at S153, the spectral width controller 30a may determine whether the setting value of the duty D is equal to or lower than a lower limit value DL. The lower limit value DL may be, for example, 0.1.

If the setting value of the duty D is not equal to or lower than the lower limit value DL (S153: NO), the spectral width controller 30a may return to S142 described above to measure the relation of the amount of change ΔE95s in the spectral width to the length of the suspension period Tr using the new setting value of the duty D.

If the setting value of the duty D is equal to or lower than the lower limit value DL (S153: YES), the spectral width controller 30a may end the process of this flowchart.

4. Line Narrowed Laser Apparatus That Controls Spectral Width Using Approximate Curve (Third Embodiment)

Figure 26:
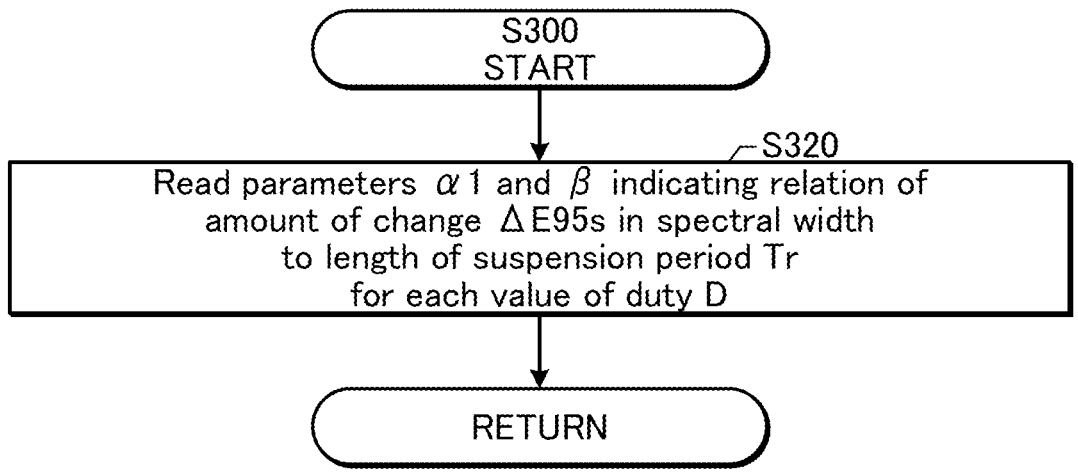
FIG. 26 is a flowchart showing a process of a spectral width controller 30a of a line narrowed laser apparatus according to a third embodiment of the present disclosure.
Figure 27:
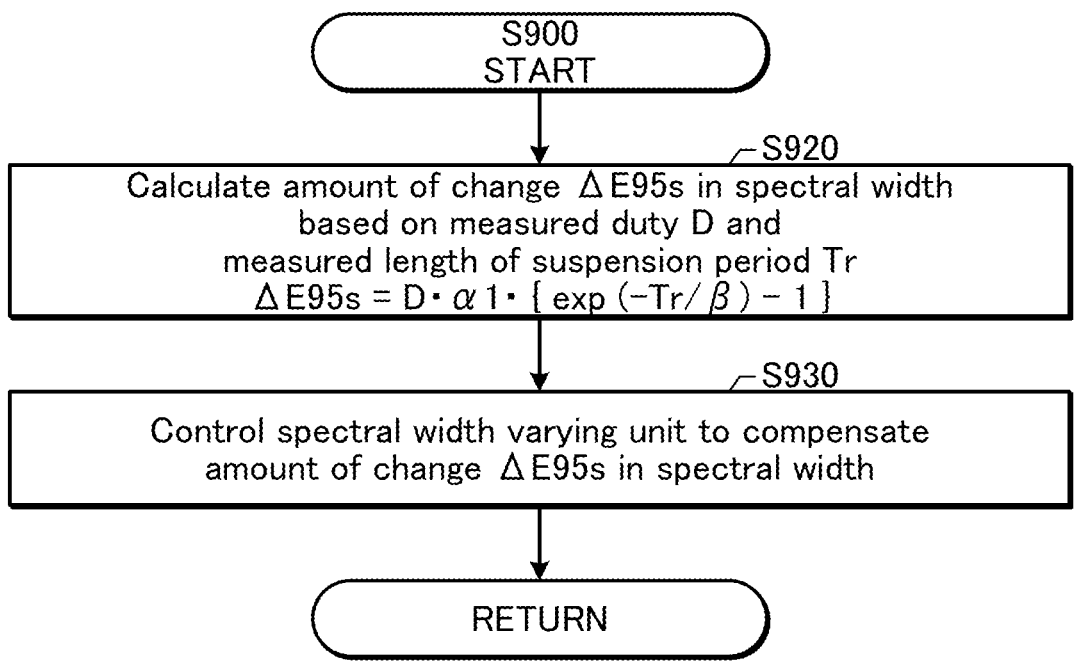
FIG. 27 is a flowchart showing a process of the spectral width controller 30a in the line narrowed laser apparatus according to the third embodiment of the present disclosure.
Figure 28:
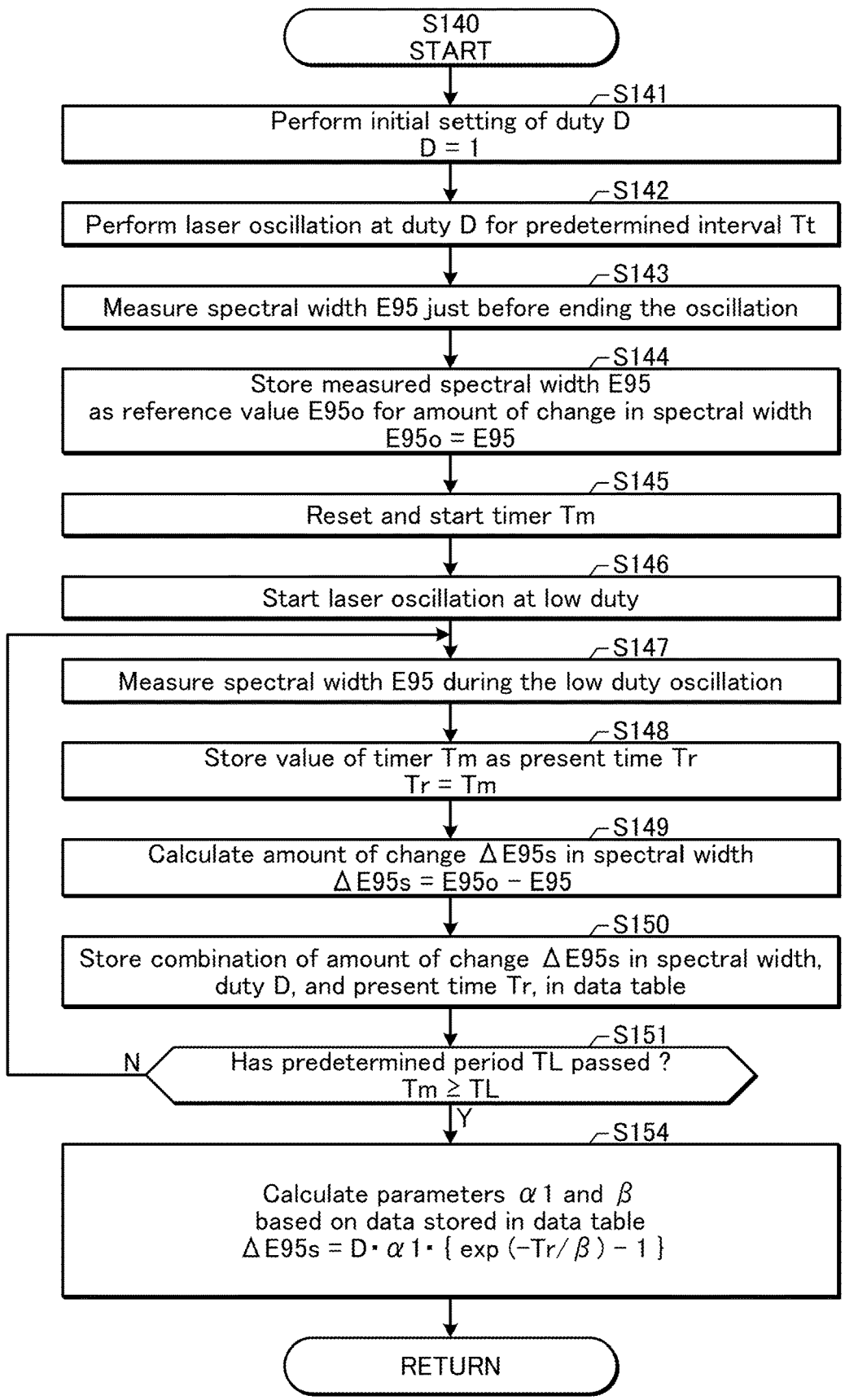
FIG. 28 is a flowchart showing a process of the spectral width controller 30a in the line narrowed laser apparatus according to the third embodiment of the present disclosure.

FIGS. 26 to 28 are flowcharts each showing a process of a spectral width controller 30a of a line narrowed laser apparatus according to a third embodiment of the present disclosure. The configuration of the line narrowed laser apparatus according to the third embodiment may be substantially the same as that of the line narrowed laser apparatus according to the second embodiment described above. In the third embodiment, calculation of the amount of change ΔE95s in the spectral width based on the value of the duty D and the length of the suspension period Tr may be performed using an approximate curve.

4.1 Control of Spectral Width

FIG. 26 shows a subroutine of the process to read data on the relation of the amount of change ΔE95s in the spectral width to the length of the suspension period Tr for each value of the duty D in the third embodiment. As shown in S320 of FIG. 26, the spectral width controller 30a may read two parameters a1 and β, in place of the data table described with reference to FIG. 16.

FIG. 27 shows a subroutine of the process to control the spectral width varying unit 15 based on the measured duty D and the measured length of the suspension period Tr in the third embodiment. As shown in S920 of FIG. 27, the spectral width controller 30a may perform calculation of the amount of change ΔE95s in the spectral width by the following formula, in place of reading the amount of change ΔE95s in the spectral width from the data table.

$$\Delta E95s = D \cdot \alpha 1 \cdot \{\exp(-Tr/\beta) - 1\}$$

According to this formula, simply reading the two parameters α1 and β may allow the amount of change ΔE95s in the spectral width to be calculated based on the measured duty D and the measured length of the suspension period Tr. This formula assumes that the amount of change ΔE95s in the spectral width is in proportion to the duty D. However, the present disclosure is not limited to this. Alternatively, the amount of change ΔE95s in the spectral width may be represented by the following formula.

$$\Delta E95s = \alpha(D) \cdot \{\exp(-Tr/\beta) - 1\}$$

Here, α(D) is a function of the duty D.

The process of S930 next to S920 may be substantially the same as that shown in FIG. 19.

4.2 Adjusting Oscillation

FIG. 28 is a flowchart showing details of a process of the adjusting oscillation according to the third embodiment. The process from S141 to S151 in FIG. 28 may be substantially the same as that described with reference to FIG. 25. For example, the measurement result may be stored in the data table at S150.

Next to S151 in FIG. 28, at S154, the spectral width controller 30a may calculate the two parameters α1 and β based on the data stored in the data table. The parameters α1 and β may be calculated by a least squares method such that the value of the amount of change ΔE95s in the spectral width calculated by substituting the duty D and the length of the suspension period Tr in the following formula approximates the measurement result.

$$\Delta E95s = D \cdot \alpha 1 \cdot \{\exp(-Tr/\beta) - 1\}$$

In other aspects, the third embodiment may be substantially the same as the second embodiment.

5. Modified Examples of Measuring Duty

5.1 First Modified Example

Figure 29:
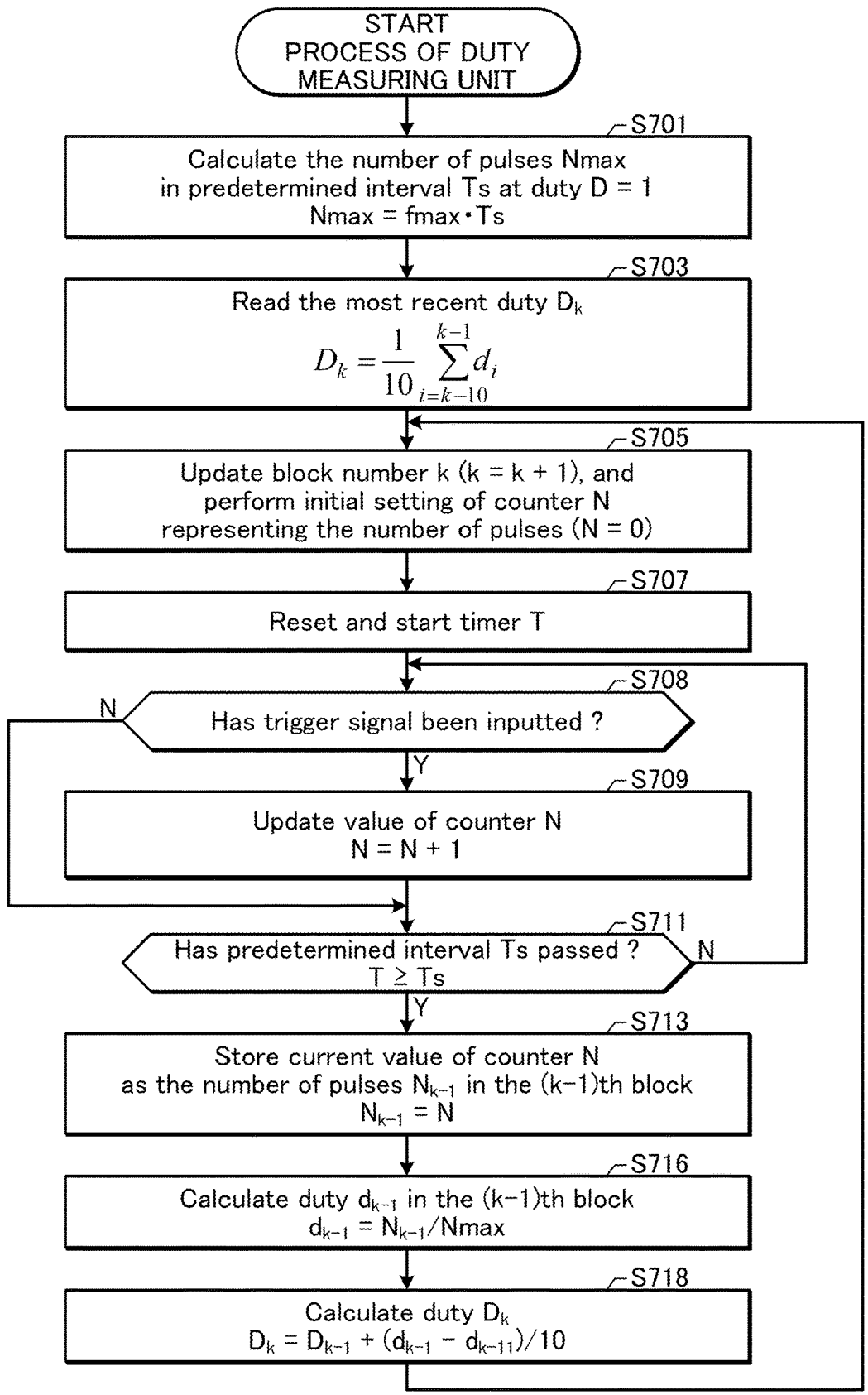
FIG. 29 is a flowchart of a first modified example of the process of the duty measuring unit in each of the first to third embodiments.

FIG. 29 is a flowchart of a first modified example of the process of the duty measuring unit in each of the first to third embodiments. The process shown in FIG. 29 may be performed in place of the process of the duty measuring unit described with referenced to FIG. 20. In FIG. 29, the duty measuring unit 30c may measure a moving average of the duty.

Firstly, the process of S701 may be substantially the same as that described with reference to FIG. 20.

At S703 next to S701, the duty measuring unit 30c may read the most recent duty $D_k$ from an unillustrated storage medium. The duty $D_k$ may be calculated by the following formula.

$$D_k = \frac{1}{10} \sum_{i=k-10}^{k-1} d_i$$

In the formula described above, i may be an integer to identify an individual period of a plurality of consecutive periods. The smaller the value of i is, the older the period is. Each period identified by the value of i may be referred to as a block. In the formula described above, $d_i$ may be a duty in each block, where a predetermined measurement period for measuring the duty is divided into blocks. Namely, $d_1$ is a duty in a first block, $d_2$ is a duty in a second block next to the first block, and $d_{k-1}$ is a duty in a block just before the current block. Accordingly, the duty $D_k$ shown in the formula described above may be an arithmetic average of the values of the duty $d_i$ in the most recent 10 consecutive blocks. The duty $D_k$ may not be limited to that calculated from the values of the duty $d_i$ in 10 blocks. The duty $D_k$ may be calculated from the values of the duty $d_i$ in the smaller or larger number of blocks.

At S705 next to S703, the duty measuring unit 30c may add 1 to the value of a block number k identifying the current block to update the value of k. The duty measuring unit 30c may perform an initial setting of the value of a counter N representing the number of pulses to 0.

The process next to S705, from S707 to S711, may be substantially the same as that in FIG. 20. The number of pulses in the current block may thus be counted.

If a predetermined interval Ts has passed (S711: YES), the duty measuring unit 30c may proceed to S713. Here, the predetermined interval Ts may be, for example, 3 seconds.

At S713, the duty measuring unit 30c may store the current value of the counter N as the number of pulses $N_{k-1}$ in the (k−1)th block in an unillustrated storage device.

Next, at S716, the duty measuring unit 30c may calculate the duty $d_{k-1}$ in the (k−1)th block by the following formula.

$d_{k-1}=N_{k-1}/N\mathrm{max}$

Next, at S718, the duty measuring unit 30c may calculate the duty $D_k$ in the following manner. Firstly, the following formula may be derived from the formula of $D_k$ described above.

$$D_{k-1} = \frac{1}{10} \sum_{i=k-11}^{k-2} d_i$$

The following formula may then be derived from the difference between $D_k$ and $D_{k-1}$.

$D_k=D_{k-1}+(d_{k-1}-d_{k-11})/10$

The duty measuring unit 30c may calculate the duty $D_k$ by this formula.

In other aspects, the process in FIG. 29 may be substantially the same as that in FIG. 20.

According to the process in FIG. 29, the duty $d_{k-1}$ in the newest block may be frequently reflected to the duty $D_k$, and thus the newest data may be frequently acquired. Further, a predetermined period for measuring the duty $D_k$ may be 10 times as long as the predetermined interval Ts, which allows acquiring stable data.

5.2 Second Modified Example

Figure 30:
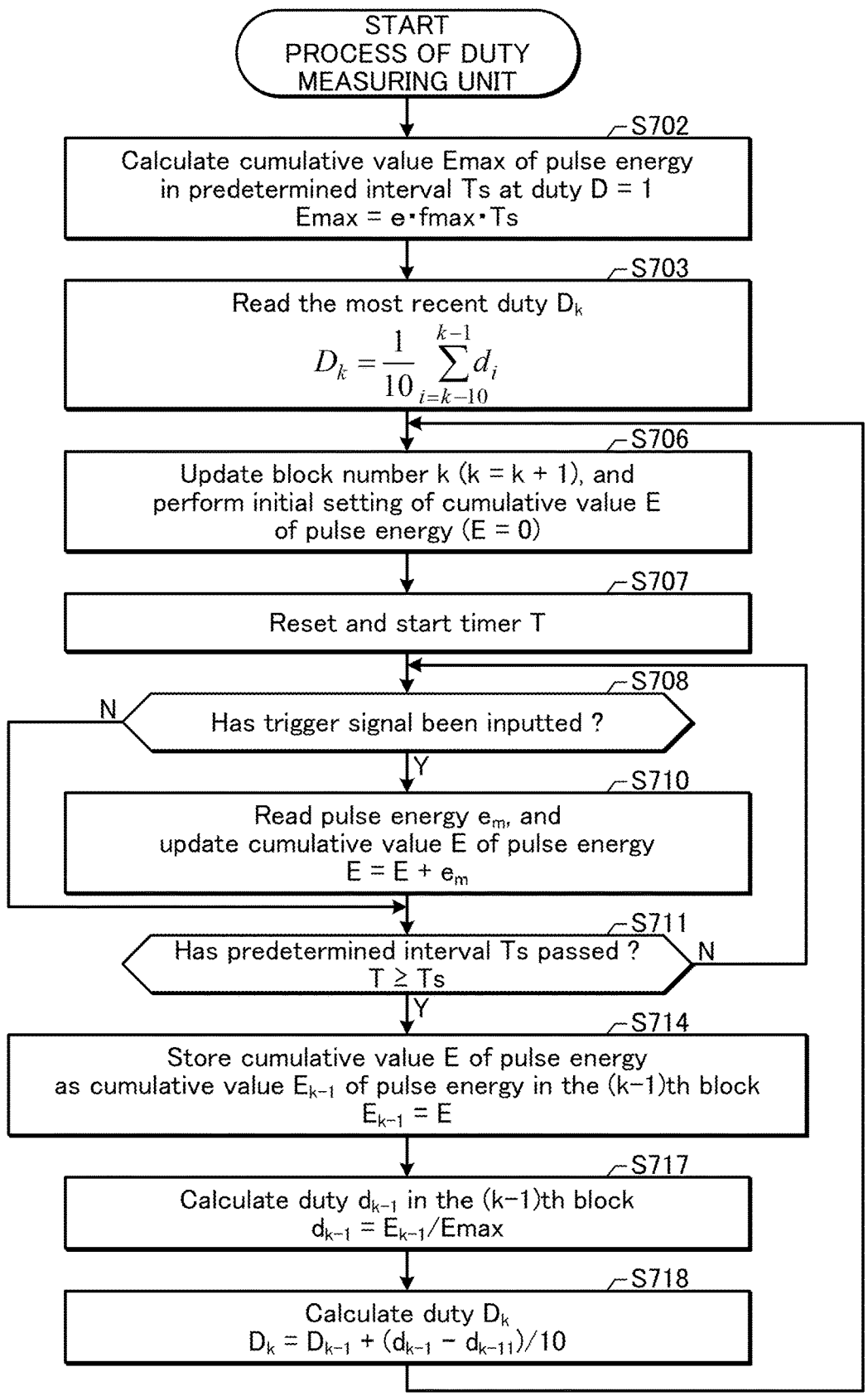
FIG. 30 is a flowchart of a second modified example of the process of the duty measuring unit in each of the first to third embodiments.

FIG. 30 is a flowchart of a second modified example of the process of the duty measuring unit in each of the first to third embodiments. The process shown in FIG. 30 may be performed in place of the process in the modified example described with referenced to FIG. 29. In FIG. 30, the duty measuring unit 30c may measure the duty by adding up pulse energy of pulses, in place of the number of pulses.

Firstly, at S702, the duty measuring unit 30c may calculate a cumulative value Emax of pulse energy in a case where the laser oscillation is performed in a predetermined interval Ts at a duty D of 1 by the following formula.

$E\mathrm{max}=e \cdot f\mathrm{max} \cdot Ts$

Here, e may be the maximum pulse energy of the line narrowed laser apparatus.

The next process of S703 may be substantially the same as that in FIG. 29.

Next, at S706, the duty measuring unit 30c may add 1 to the value of a block number k identifying the current block to update the value of k. The duty measuring unit 30c may perform an initial setting of a cumulative value E of the pulse energy to 0.

The process next to S706, from S707 to S708, may be substantially the same as that in FIG. 29.

If the trigger signal has been inputted at S708 (S708: YES), the duty measuring unit 30c may proceed to S710.

At S710, the duty measuring unit 30c may read the value of the pulse energy e outputted from the pulse energy measuring device 16c, then add the value of the pulse energy $e_m$ to the cumulative value E of the pulse energy to update the cumulative value E of the pulse energy. After S710, the duty measuring unit 30c may proceed to S711.

The process at S711 may be substantially the same as that in FIG. 29.

Next, at S714, the duty measuring unit 30c may store the current cumulative value E of the pulse energy, as the cumulative value $E_{k-1}$ of the pulse energy in the (k−1)th block in an unillustrated storage device.

Next, at S717, the duty measuring unit 30c may calculate the duty $d_{k-1}$ in the (k−1)th block by the following formula.

$d_{k-1}=E_{k-1}/E\mathrm{max}$

Next, at S718, the duty measuring unit 30c may calculate the duty $D_k$. The process at S718 may be substantially the same as that in FIG. 29.

6. Line Narrowed Laser Apparatus That Controls Spectral Width by Synchronization of MOPO (Fourth Embodiment)

Figure 31:
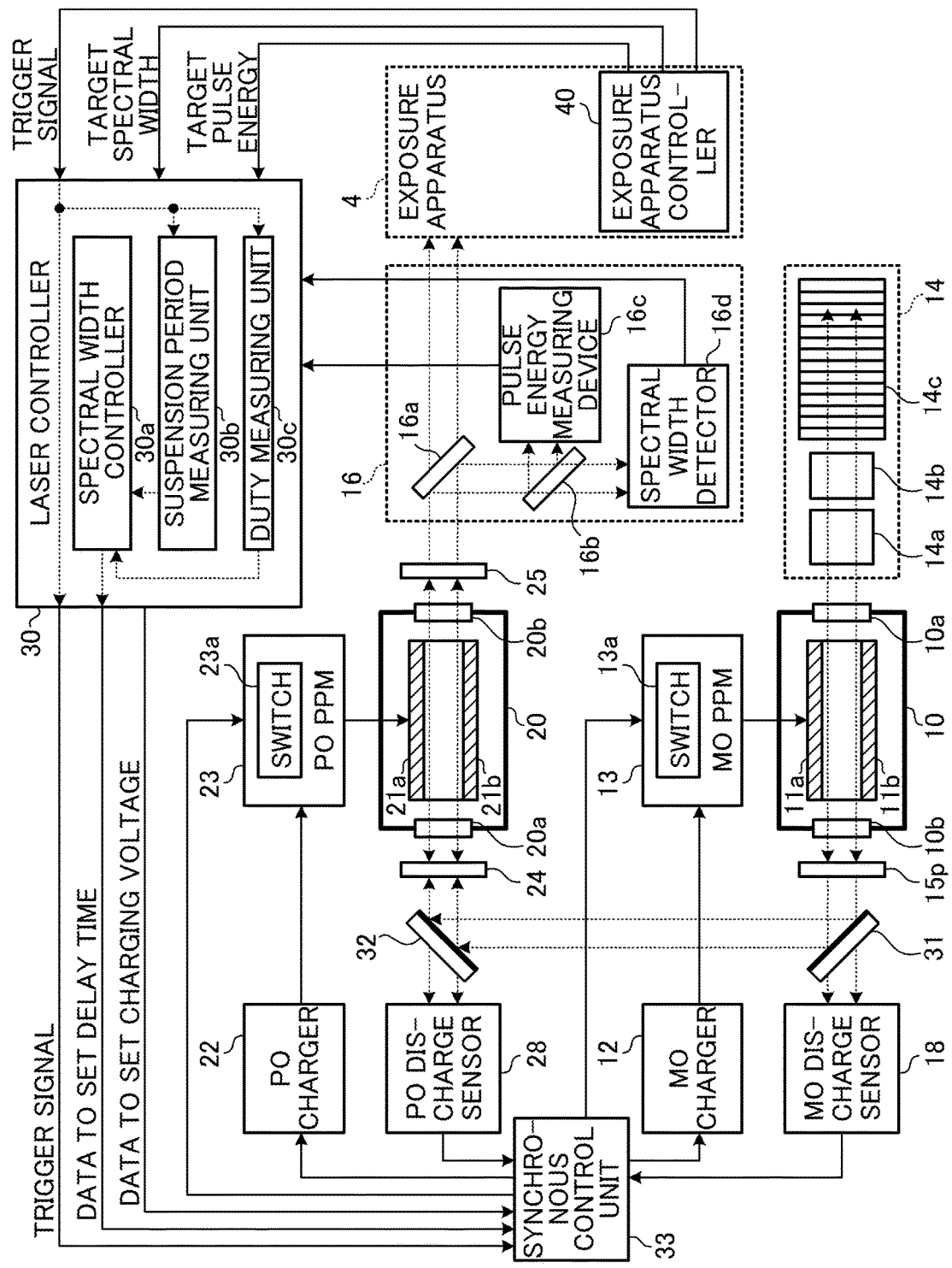
FIG. 31 schematically shows a configuration of a line narrowed laser apparatus according to a fourth embodiment of the present disclosure.

FIG. 31 schematically shows a configuration of a line narrowed laser apparatus according to a fourth embodiment of the present disclosure. The fourth embodiment may include, between the laser chamber 10 and the sensor unit 16 of the line narrowed laser apparatus in the first embodiment described above, an output coupling mirror 15p, high reflective mirrors 31 and 32, and a power oscillator. The spectral width varying unit 15 may be omitted.

The output coupling mirror 15p may be a partially reflective mirror, without function of adjusting the wavefront. The output coupling mirror 15p may be coated with a film that partially reflects light having wavelength of the laser oscillation of the line narrowed laser apparatus, and transmits visible discharge light generated by the discharge between the pair of discharge electrodes 11a and 11b at high transmittance. In the fourth embodiment, the laser chamber 10, the pair of discharge electrodes 11a and 11b, the charger 12, the pulse power module 13, the line narrow module 14, and the output coupling mirror 15p may constitute a master oscillator (MO).

The high reflective mirrors 31 and 32 may reflect the pulse laser beam outputted from the output coupling mirror 15p at high reflectance to allow the beam to be incident on a rear mirror 24 of the power oscillator (PO). The high reflective mirrors 31 and 32 may be coated with a film to transmit the visible discharge light. A part of the visible discharge light generated by the electric discharge between the pair of discharge electrodes 11a and 11b may be transmitted by the output coupling mirror 15p and the high reflective mirror 31, to be incident on an MO discharge sensor 18. The M) discharge sensor 18 may detect the timing of the electric discharge between the pair of discharge electrodes 11a and 11b of the master oscillator based on the visible discharge light transmitted by the output coupling mirror 15p and the high reflective mirror 31. A signal to show the timing of discharge may be outputted to a synchronous control unit 33.

The power oscillator may include a laser chamber 20, a pair of discharge electrodes 21a and 21b, a charger 22, and a pulse power module 23. Configurations of these elements may be substantially the same as those of corresponding elements in the master oscillator. The power oscillator may further include the rear mirror 24 and an output coupling mirror 25. The rear mirror 24 and the output coupling mirror 25, constituting an optical resonator, may each be a partially reflective mirror. The output coupling mirror 25 may be coated with a film to partially reflect the light having wavelength of the laser oscillation. Here, the reflectance of the partially reflective film of the output coupling mirror 25 may be in a range of 10% to 30%.

A part of the pulse laser beam incident on the rear mirror 24 from the high reflective mirror 32 may enter the laser chamber 20 and be amplified while reciprocating between the output coupling mirror 25 and the rear mirror 24. The pulse laser beam thus amplified may be outputted through the output coupling mirror 25. Such laser apparatus including the power oscillator to amplify the pulse laser beam outputted from the master oscillator may be referred to as a MOPO type laser apparatus.

The rear mirror 24 may be coated with a film to partially reflect the light having wavelength of the laser oscillation, and transmit the visible discharge light at high transmittance. Here, the reflectance of the partially reflective film on the rear mirror 24 may be in a range of 70% to 90%. A part of the visible discharge light generated by the electric discharge between the pair of discharge electrodes 21a and 21b may travel via the rear mirror 24 and the high reflective mirror 32 to a PO discharge sensor 28. The PO discharge sensor 28 may be configured to detect timing of the electric discharge between the pair of discharge electrodes 21a and 21b of the power oscillator based on the visible discharge light transmitted by the rear mirror 24 and the high reflective mirror 32. A signal to show the timing of discharge may be outputted to the synchronous control unit 33.

The laser controller 30 may output a trigger signal to the synchronous control unit 33. The synchronous control unit 33 may output a first switching signal to the switch 13a of the pulse power module 13 of the master oscillator based on the trigger signal received from the laser controller 30, and output a second switching signal to a switch 23a of the pulse power module 23 of the power oscillator. Here, the synchronous control unit 33 may control the timing of the first switching signal and the second switching signal such that the delay time of the timing of discharge in the power oscillator from the timing of discharge in the master oscillator approaches a desired delay time.

Figure 32:
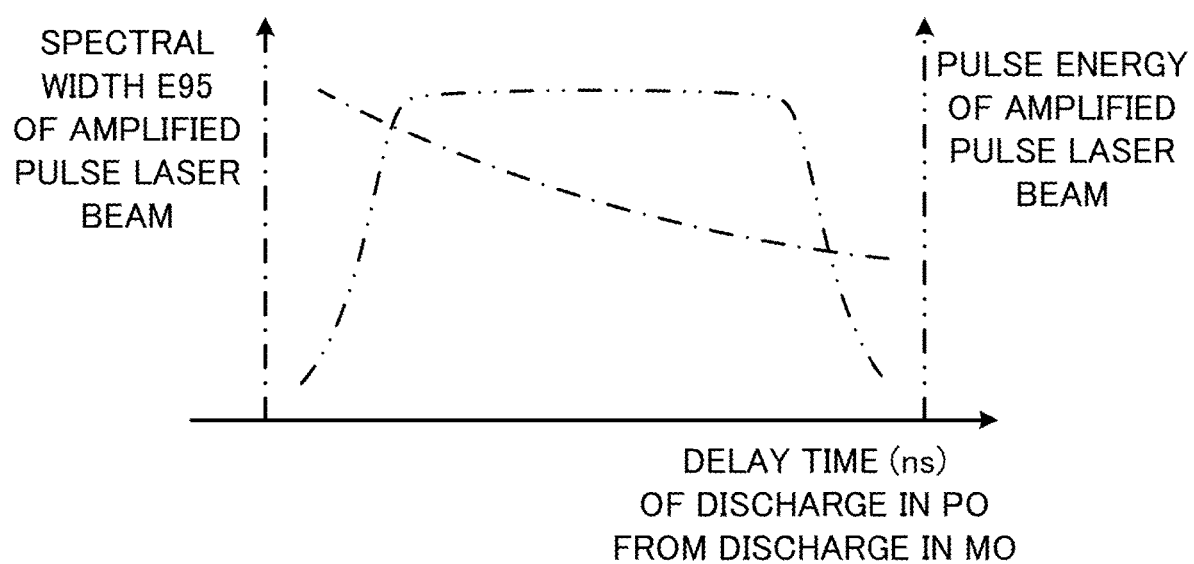
FIG. 32 shows pulse energy and spectral width in relation to delay time of a timing of discharge in a power oscillator from a timing of discharge in a master oscillator in a MOPO type laser apparatus.

FIG. 32 shows the pulse energy and the spectral width in relation to the delay time of the timing of discharge in the power oscillator from the timing of discharge in the master oscillator in the MOPO type laser apparatus. As shown in FIG. 32, if the delay time of the timing of discharge in the power oscillator from the timing of discharge in the master oscillator is within a predetermined acceptable range, the pulse energy of the pulse laser beam outputted from the power oscillator may be substantially constant. However, even in the acceptable range, the spectral width of the pulse laser beam outputted from the power oscillator may be different according to the delay time of the timing of discharge in the power oscillator from the timing of discharge in the master oscillator. Specifically, the longer the delay time is, the narrower the spectral width is. Thus, in the fourth embodiment, the spectral width may be controlled by adjusting the delay time of the timing of discharge in the power oscillator from the timing of discharge in the master oscillator.

In other aspect, the fourth embodiment may be substantially the same as the first to third embodiments.

The optical resonator of the power oscillator in the fourth embodiment is a Fabry-Perot resonator. However, the present disclosure may not necessarily be limited to this embodiment. A ring type resonator may also be used.

7. Configuration of Controller

Figure 33:
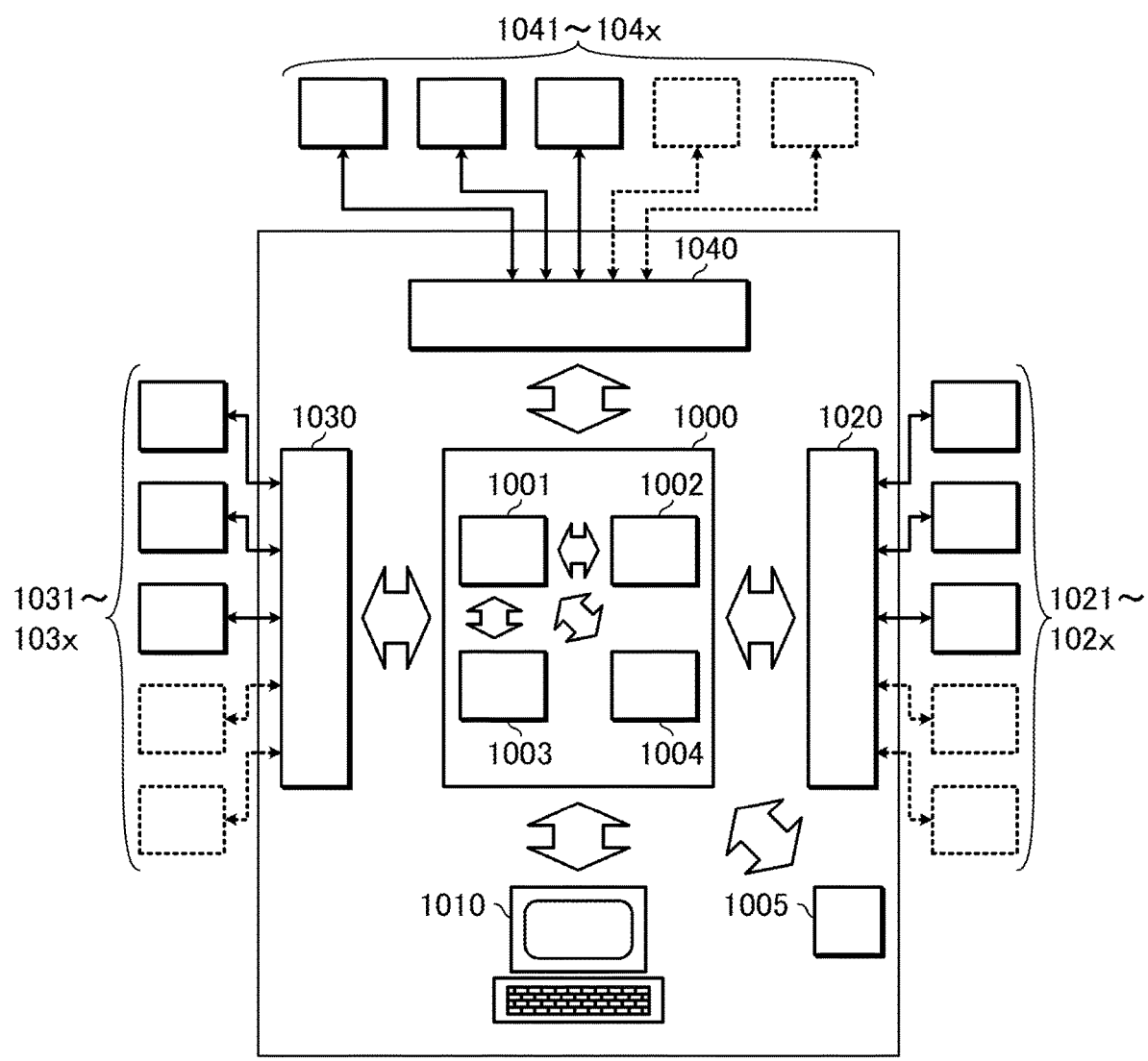
FIG. 33 is a block diagram schematically showing a configuration of the controller.

FIG. 33 is a block diagram schematically showing a configuration of the controller.

Controllers of the above-described embodiments, such as the laser controller 30 and the synchronous control unit 33, may be general-purpose control devices, such as computers or programmable controllers. For example, the controllers may be configured as follows.

Configuration

The controllers may each include a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may include a central processing unit (CPU) 1001, and a memory 1002, a timer 1003, and a graphics processing unit (GPU) 1004 which are connected to the CPU 1001.

Operation

The processor 1000 may read a program stored in the storage memory 1005, execute the read program, read data from the storage memory 1005 in accordance with the program, or store data in the storage memory 1005.

The parallel I/O controller 1020 may be connected to devices 1021 to 102x with which it may communicate through parallel I/O ports. The parallel I/O controller 1020 may control digital-signal communication through the parallel I/O ports while the processor 1000 executes the program.

The serial I/O controller 1030 may be connected to devices 1031 to 103x with which it may communicate through serial I/O ports. The serial I/O controller 1030 may control digital-signal communication through the serial I/O ports while the processor 1000 executes the program.

The A/D and D/A converter 1040 may be connected to devices 1041 to 104x with which it may communicate through analog ports. The A/D and D/A converter 1040 may control analog-signal communication through the analog ports while the processor 1000 executes the program.

The user interface 1010 may be configured to display the progress of the program being executed by the processor 1000 in accordance with instructions from an operator, or to cause the processor 1000 to stop the execution of the program or perform an interrupt in accordance with instructions from the operator.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time and output it to the CPU 1001 in accordance with the program being executed. When image data is inputted to the processor 1000, the GPU 1004 may process the image data in accordance with the program being executed and output the results to the CPU 1001.

The devices 1021 to 102x, which are connected through the parallel I/O ports to the parallel I/O controller 1020, may be used when the exposure apparatus controller 40, another controller, or the like receives or sends the trigger signal or other timing signal.

The devices 1031 to 103x, which are connected through the serial I/O ports to the serial I/O controller 1030, may be used when the exposure apparatus controller 40, another controller, or the like sends or receives data.

The devices 1041 to 104x, which are connected through the analog ports to the A/D and D/A converter 1040, may serve as various sensors, such as the pulse energy measuring device 16c, the spectral width detector 16d, or the like.

The controllers thus configured may be capable of realizing the operations described in the embodiments.

The above descriptions are intended to be only illustrative rather than being limiting. Accordingly, it will be clear to those skilled in the art that various changes may be made to the embodiments of the present disclosure without departing from the scope of the appended claims.

The terms used in the present specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or "an" as used in the present specification and the appended claims should be interpreted as meaning "at least one" or "one or more".

The invention claimed is:

1. A line narrowed laser apparatus configured to perform a plurality of burst oscillations including a first burst oscillation and a second burst oscillation next to the first burst oscillation to output a pulse laser beam, comprising:
    a laser resonator;
    a chamber provided in the laser resonator;
    a pair of electrodes provided in the chamber;
    an electric power source configured to apply pulsed voltage to the pair of electrodes;
    a wavelength selecting element provided in the laser resonator;
    a spectral width varying unit provided in the laser resonator; and
    a controller configured to measure a duty in a predetermined period before starting the second burst oscillation and a length of a suspension period from a time of ending the first burst oscillation to a time of starting the second burst oscillation, and perform a first control of the spectral width varying unit based on the duty and the length of the suspension period, wherein
    the duty is an arithmetic average of individual duties in two or more most recent consecutive blocks constituting the predetermined period, each individual duty of the individual duties being a ratio of an actual number of pulses in the block to a maximum number of pulses in a case where the pulse laser beam is outputted in the block at a maximum repetition frequency.

2. The line narrowed laser apparatus according to claim 1, wherein
    the controller is accessible to a medium that stores a relation of an amount of change in the spectral width to the duty and the length of the suspension period, and
    the controller performs the first control of the spectral width varying unit based on data acquired from the medium.

3. The line narrowed laser apparatus according to claim 2, wherein the medium stores the relation of the amount of change in the spectral width to the length of the suspension period as a damping function with a first order lag for each value of the duty.

4. The line narrowed laser apparatus according to claim 2, further comprising:
    a spectral width detector provided in an optical path of the pulse laser beam outputted from the laser resonator, wherein
    the controller calculates the relation of the amount of change in the spectral width to the duty and the length of the suspension period, based on output from the spectral width detector, and stores the relation in the medium.

5. The line narrowed laser apparatus according to claim 1, further comprising:
    a spectral width detector provided in an optical path of the pulse laser beam outputted from the laser resonator, wherein
    the controller performs
    the first control of the spectral width varying unit based on the duty and the length of the suspension period, the first control being performed after ending the first burst oscillation and before starting the second burst oscillation, and
    a second control to control the spectral width varying unit based on output from the spectral width detector, the second control being performed during the period of the second burst oscillation.

6. The line narrowed laser apparatus according to claim 1, wherein
    the controller measures the duty based on an actual number of pulses in a first period and an actual number of pulses in a second period, the second period being later than the first period, and
    the controller updates the duty based on the actual number of pulses in the second period and an actual number of pulses in a third period, the third period being later than the second period.

7. The line narrowed laser apparatus according to claim 1, wherein
    the arithmetic average is a moving average of the two or more most recent consecutive blocks of a series of blocks.

8. A line narrowed laser apparatus configured to perform a plurality of burst oscillations including a first burst oscillation and a second burst oscillation next to the first burst oscillation to output a pulse laser beam, comprising:
    a laser resonator;
    a chamber provided in the laser resonator;
    a pair of electrodes provided in the chamber;
    an electric power source configured to apply pulsed voltage to the pair of electrodes;
    a wavelength selecting element provided in the laser resonator;

a spectral width varying unit provided in the laser resonator;

a controller configured to measure a duty in a predetermined period before starting the second burst oscillation and a length of a suspension period from a time of ending the first burst oscillation to a time of starting the second burst oscillation, and perform a first control of the spectral width varying unit based on the duty and the length of the suspension period; and a pulse energy measuring device provided in an optical path of the pulse laser beam outputted from the laser resonator, wherein the duty is an arithmetic average of individual duties in two or more most recent consecutive blocks constituting the predetermined period, each individual duty of the individual duties being a ratio of a cumulative value of pulse energy of the pulse laser beam measured in the block to a product of a maximum pulse energy of the pulse laser beam, a maximum repetition frequency of the pulse laser beam, and a length of the block predetermined.

9. The line narrowed laser apparatus according to claim 8, wherein the controller measures the duty based on a cumulative value of pulse energy of the pulse laser beam in a first period and a cumulative value of pulse energy of the pulse laser beam in a second period, the second period being later than the first period, and the controller updates the duty based on the cumulative value of pulse energy of the pulse laser beam in the second period and a cumulative value of pulse energy of the pulse laser beam in a third period, the third period being later than the second period.

10. The line narrowed laser apparatus according to claim 8, wherein the arithmetic average is a moving average of the two or more most recent consecutive blocks of a series of blocks.

11. A line narrowed laser apparatus configured to perform a plurality of burst oscillations including a first burst oscillation and a second burst oscillation next to the first burst oscillation to output a pulse laser beam, comprising:

a laser resonator;
a first chamber provided in the laser resonator;
a first pair of electrodes provided in the first chamber;
a first electric power source configured to apply pulsed voltage to the first pair of electrodes;
a wavelength selecting element provided in the laser resonator;
a second chamber provided in an optical path of the pulse laser beam outputted from the laser resonator;
a second pair of electrodes provided in the second chamber;
a second electric power source configured to apply pulsed voltage to the second pair of electrodes; and
a controller configured to measure a duty in a predetermined period before starting the second burst oscillation and a length of a suspension period from a time of ending the first burst oscillation to a time of starting the second burst oscillation, and perform a first control of a difference between a timing of a first electric discharge between the first pair of electrodes and a timing of a second electric discharge between the second pair of electrodes based on the duty and the length of the suspension period, wherein
the duty is an arithmetic average of individual duties in two or more most recent consecutive blocks constituting the predetermined period, each individual duty of the individual duties being a ratio of an actual number of pulses in the block to a maximum number of pulses in a case where the pulse laser beam is outputted in the block at a maximum repetition frequency.

12. The line narrowed laser apparatus according to claim 11, further comprising:

a first sensor configured to measure the timing of the first electric discharge between the first pair of electrodes; and a second sensor configured to measure the timing of the second electric discharge between the second pair of electrodes, wherein the controller performs the first control by controlling a difference between a timing of a first trigger signal outputted to the first electric power source and a timing of a second trigger signal outputted to the second electric power source based on output from the first sensor and output from the second sensor.

13. The line narrowed laser apparatus according to claim 11, wherein the controller is accessible to a medium that stores a relation of an amount of change in the spectral width to the duty and the length of the suspension period, and the controller performs the first control of the difference between the timing of the first electric discharge between the first pair of electrodes and the timing of the second electric discharge between the second pair of electrodes based on data acquired from the medium.

14. The line narrowed laser apparatus according to claim 13, wherein the medium stores the relation of the amount of change in the spectral width to the length of the suspension period as a damping function with a first order lag for each value of the duty.

15. The line narrowed laser apparatus according to claim 13, further comprising:

a spectral width detector provided in an optical path of the pulse laser beam outputted from the laser resonator, wherein the controller calculates the relation of the amount of change in the spectral width to the duty and the length of the suspension period, based on output from the spectral width detector, and stores the relation in the medium.

16. The line narrowed laser apparatus according to claim 11, further comprising:

a spectral width detector provided in an optical path of the pulse laser beam outputted from the laser resonator, wherein the controller performs the first control of the difference between the timing of the first electric discharge between the first pair of electrodes and the timing of the second electric discharge between the second pair of electrodes based on the duty and the length of the suspension period, the first control being performed after ending the first burst oscillation and before starting the second burst oscillation, and a second control of the difference between the timing of the first electric discharge between the first pair of electrodes and the timing of the second electric discharge between the second pair of electrodes based on output from the spectral width detector, the second control being performed during the period of the second burst oscillation.

17. The line narrowed laser apparatus according to claim 11, wherein the controller measures the duty based on an actual number of pulses in a first period and an actual number of pulses in a second period, the second period being later than the first period, and the controller updates the duty based on the actual number of pulses in the second period and an actual number of pulses in a third period, the third period being later than the second period.

18. The line narrowed laser apparatus according to claim 11, wherein the arithmetic average is a moving average of the two or more most recent consecutive blocks of a series of blocks.

* * * * *